(12) United States Patent
Müschenborn

(10) Patent No.: US 6,807,582 B1
(45) Date of Patent: Oct. 19, 2004

(54) INTERPROCESS COMMUNICATION SYSTEM

(75) Inventor: Hans-Joachim Müschenborn, Bonn (DE)

(73) Assignee: Hans-Joachim Muschenborn, Zug (CH)

( * ) Notice: Subject to any disclaimer, the term of this patent is extended or adjusted under 35 U.S.C. 154(b) by 0 days.

(21) Appl. No.: 09/558,435

(22) Filed: Apr. 25, 2000

(30) Foreign Application Priority Data

Apr. 26, 1999 (DE) .......................................... 199 18 896

(51) Int. Cl.[7] .............................................. G06F 15/16
(52) U.S. Cl. ........................ 709/252; 719/313; 709/201; 718/101
(58) Field of Search ................................ 709/310–320, 709/101, 200–203, 252, 238–244, 249–253; 718/101; 719/310–320

(56) References Cited

U.S. PATENT DOCUMENTS

| | | | | |
|---|---|---|---|---|
| 5,041,963 A | * | 8/1991 | Ebersole et al. ............. | 370/407 |
| 5,274,631 A | | 12/1993 | Bhardwaj ..................... | 370/60 |
| 5,287,453 A | * | 2/1994 | Roberts ....................... | 709/201 |
| 5,596,579 A | | 1/1997 | Yasrebi ....................... | 395/678 |
| 5,644,719 A | | 7/1997 | Aridas et al. .......... | 395/200.12 |
| 5,652,751 A | | 7/1997 | Sharony ...................... | 370/227 |
| 5,909,542 A | * | 6/1999 | Paquette et al. ............ | 709/203 |

FOREIGN PATENT DOCUMENTS

| | | | | |
|---|---|---|---|---|
| EP | 0 876 067 A1 | 4/1998 | ............ | H04Q/3/00 |
| EP | 0 705 463 B1 | 6/1999 | ........... | G06F/17/60 |

OTHER PUBLICATIONS

ISBN3 423 50175 8 (dtv) Martin Kimming, *Internet dtv*, München Jun. 1995, pp. 9–26.

(List continued on next page.)

*Primary Examiner*—St. John Courtenay, III

(57) ABSTRACT

The present invention concerns interprocess communication systems consisting of an arbitrary number of homogeneous or heterogeneous physically connected units, where a central unit executes at least one central process—called Central Process—and at least one of the units executes peripheral process(es), which are connected to the Central Process via at least one standing logical bidirectional connection. The Central Process assigns logical identifications to the connections of the peripheral processes. Using these logical identifications, peripheral processes can communicate independently of the physical units with selected peripheral processes or connections. Peripheral processes of the same kind can be exchanged transparently for other peripheral processes.

Peripheral processes can maintain parallel connections to multiple Central Processes and Central Processes can be linked directly or indirectly via links to arbitrary hierachies or topologies. Multiple individual subsystems can access shared peripheral processes without knowledge of the other subsystems or the ability to communicate with the other subsystems.

Interprocess communication systems according to this invention can run outside of firewall protected areas and still be accessed only by a limited user group. Such networks can be applied advantageously in electronic-commerce, for example, as providers of online-system-services.

The security of existing firewall systems can be greatly increased by appropriate interfacing of systems according to this invention with traditional networks.

32 Claims, 13 Drawing Sheets

OTHER PUBLICATIONS

Bildschirmausdruck: gleichzeitige Prozesse.

Devid Espenschied, *PC Intern* Feb. 2001 Apr.–Jun., pp. 14–29.

gated.proto (4), Gate daemon configuration file, 50 pages.

tcp (7), tcp—Internet Transmission Control protocol (TCP), 4 pages.

inetd (8), inetd—Internet super–server.

* cited by examiner

INTERPROCESS COMMUNICATION SYSTEM

TECHNICAL FIELD

This inventions relates to systems for interprocess communication in homogeneous and heterogeneous networks independent of the physical units and the physical network architecture.

BACKGROUND OF THE INVENTION

Interprocess communication systems consist of one or more physically connected units executing two or more processes, which processes can build logical—i.e. independent of the physical transmission—connections between each other and exchange information via these logical connections. Homogeneous systems consist of units of the same kind controlled by programs of the same kind. Heterogeneous systems consist of similar or different units, which are controlled by similar or different programs, where the networking components of the controlling programs of each network unit are based on the same protocol to initiate connections and to exchange information.

Prior art logical connections are initiated according to the following scheme: A unit characterized by a unique physical identification executes a process (called server), which provides at least one logical connection endpoint, where the endpoint is identified by a local identification unique on the server executing unit. The server waits until another process (called client), which runs on the same or another unit, requests a connection to the said endpoint of the server. Suppose the units executing the server and the client are physically connected, and the client needs the unique identification of the unit executing the server and the local identification of the endpoint which the server provides. Both pieces of information together are sufficient to uniquely identify the endpoint of a server in the whole network. The server decides to accept or deny incoming connection requests. A connection is established only if the server accepts an incoming request, eventually after checking the clients access rights. If the check of the clients access rights turns out negative the server terminates the connection request and no connection is established. This mechanism allows only logical point-to-point connections between a single client and a single server. Logical connections between two clients, two servers or more than two client and/or servers are not possible.

Prior art services are transaction oriented servers, which wait for a transaction request after a successfull connection to a client has been established, upon reception of a transaction request execute a predefined action and eventually report the result of the action to the client. The complete sequence, starting at the transaction request and terminated by the transmission of the result is called a transaction. The transaction request of a client does not need to be sent explicitly as a message to the server. Instead the request can be implied by the client connecting to the server alone.

A connection between service and client can be established for a single transaction (temporary connection) or multiple transactions (standing connection). After completion of all transactions one communication partner closes the connection which signals to the other partner to close the connection on his side too.

Typical examples of such networks are the internet or internet like intranets, which are build of several programmable and physically Linked computers. Each computer is executed by an operating system, the network and the application programs. Homogeneous systems contain identical or different computers controlled by the same operating system. Heterogeneous systems contain similar or different computers controlled by the same or different operating systems. The networking programs follow typically the ISO/OSI-model, use the TCP/IP-stack and serve for the information exchange between different software components running on the same or different machines.

The mentioned description of prior art client/server systems in general is explained in the following paragraph taking the TCP/IP-protocol as well known example. The TCP/IP-protocol is per definition a connection oriented protocol based on the ISO/OSI-model between two uniquely identified communication partners, which permits on the one hand to build up a logical point-to-point connection between one unique client and one unique server, and on the other hand guarantees the reliable physical and logical message transmission between server and client, such that the transmitted bytes are received in the same order as they were sent independent of how many and which physical data packets a message needed to be split during physical transport and independent of the physical path each individual data packet was transmitted in the physical network.

A connection endpoint of a TCP/IP-server process is uniquely identified by the IP-address of the machine executing the TCP/IP-server process and a the port-address. The port-address can be interpreted as a logical address locally unique on the machine executing the server process. Thus network-wide unique TCP/IP-server addresses comprise the physical IP-address as well as the local logical port address. The vector (IP-address, port-address) is bound to the TCP/IP-server machine and not logical (i.e. independent of the physical unit), because it contains IP-address of the TCP/IP-server machine.

Typical systems working according to the described client/server principle are the operating systems Unix, Windows NT, OS/2 or Netware as well as the middleware DCE, TUXEDO or CORBA.

Prior art networks have the following disadvantages:

1. The client/server principle allows only point-to-point connections between a single client and a single server or service. Clients needing several services have to establish separate connections to each service.
2. If all components in a network should at any time have the possibility to establish connections to any other component, each component needs to be implemented as server and client simultanously. This increases the number of servers dramatically.
3. If n components of a system should communicate between each other the required number of bidirectional point-to-point connections is $\frac{1}{2}n(n-1)$ and increases proportionally to $\frac{1}{2}n^2$. Systems of this kind can only be operated with large number of components under uneconomical conditions and are therefore not scalable to any size.
4. The reliability of the overall system decreases with the number of connections because the risk of a broken connection increases with each additional point-to-point connection.
5. Each unit executing a server needs to be identified uniquely in the whole network.
6. Clients need to know the unique identification of the server unit and the local identification of the connection endpoint to which they connect. This implies that servers are bound to their units and cannot be replaced by similar servers on different units without the clients knowledge of the identifications of the backup units. A client transparent replacement of a given server by another server on a different unit is not possible according to the prior art.

7. In practice each server is a potential security hazard because it alone is responsible to accept/execute a client's connection/transaction. With increasing number of servers the security of the whole system decreases. To guarantee a defined security standard for the whole system each server needs to fullfill the same security standard, because the whole system is only as secure as the weakest server.

8. The history of a prior art network can be traced only with an enormous effort, because the network needs to be supervised on the physical level and the transmitted physical packets have to be assembled first to logical units to yield logically meaningfull messages or transactions. This holds especially for TCP/IP networks, which can only be effectively supervised by "Sniffing"—i.e. the direct analysis of the physically transmitted data.

9. Prior art networks utilize firewalls to guarantee security. The firewalls are located between clients and servers and forward only predefined messages from predefined sources to predefined targets and allow only authorized clients to connect to and transact with authorized services. This additional filtering reduces the performance of the whole system.

These problems can be illustrated taking the TCP/IP-protocol as example:

1. A TCP/IP-client can communicate via a single connection only with a single TCP/IP-server, which means that a TCP/IP-client can neither communicate with another TCP/IP-client nor via a single connection with more than one TCP/IP-server.

2. A TCP/IP-server can accept via a single connection only a single TCP/IP-client, which means that a TCP/IP-server can neither communicate with other TCP/IP-servers nor via a single connection with more than one TCP/IP-client.

3. In all cases TCP/IP-clients need at least the IP-address of the TCP/IP-server machine as well as the port-address of the TCP/IP-server process to address a TCP/IP-server process uniquely in the whole network. The connection is bound to the TCP/IP-server machine because of the required IP-address.

OBJECT OF THIS INVENTION

The object of this invention is to realize an interprocess communication system without the aforementioned disadvantages, which offers the possibility of a unit independent logical communication of all components with each other, which allows for a client transparent replacement of services, while minimizing the transmission time of individual messages and optimizing the system reliability and security.

SUMMARY OF THE INVENTION

The present invention overcomes the prior art limitations by implementing a starlike interprocess communication systems consisting of an arbitrary number of homogeneous or heterogeneous physically connected units, where a central unit executes at least one central process—called Central Process—and at least one of the units executes peripheral process(es), which are connected to the Central Process via at least one standing logical bidirectional connection. The Central Process assigns logical identifications to the connections of the peripheral processes. Using these logical identifications peripheral processes can communicate independently of the physical units with selected peripheral processes or connections. Peripheral processes of the same kind can be exchanged transparently for other peripheral processes.

Peripheral processes can maintain parallel connections to multiple Central Processes and Central Processes can be linked directly or indirectly via Links to arbitrary hierachies or topologies. Multiple individual subsystems can access shared peripheral processes without knowledge of the other subsystems or being able to communicate with the other subsystems.

Networks according to this invention can run outside of firewall protected areas and still be accessed by a limited user group only.

The security of existing firewall systems can be increased a lot by appropriate interfacing of networks according to this invention to prior art networks.

BRIEF DESCRIPTION OF THE FIGURES

Further objects, features and advantages of the invention will become apparent from the following detailed description taken in conjunction with the accompanying figures showing a preferred embodiment of the invention, in which.

Throughout the figures, the same reference numerals and characters are used to denote like features, elements, components or portions of the illustrated network.

DETAILED DESCRIPTION OF THIS INVENTION

Figure 1:
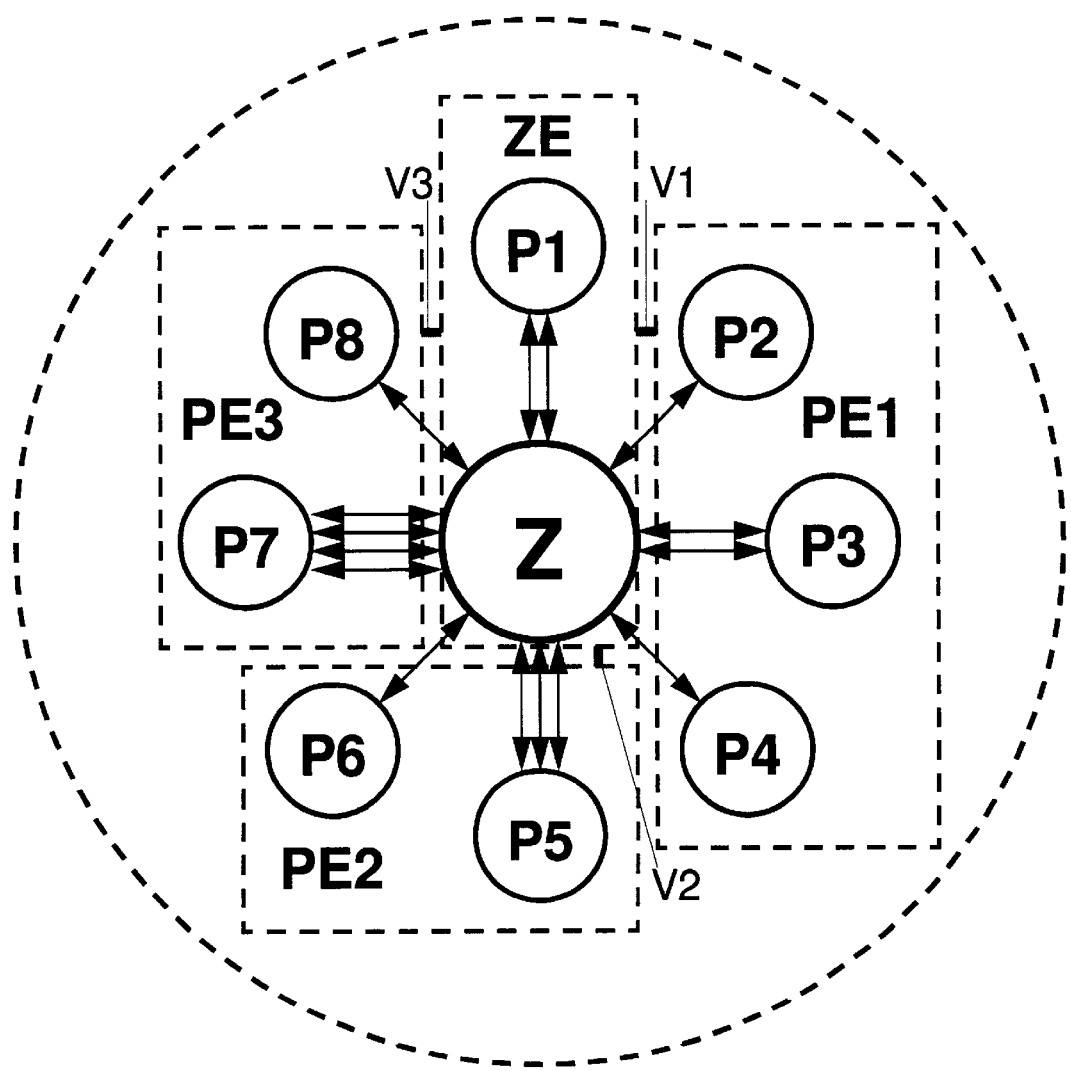
FIG. 1: illustrates an interprocess communication according to claim 1 with one Central Process Z and multiple peripheral processes PE1–PE8 connected to Z via one or more standing bidirectional logical connections.

Starlike network architectures can be used to solve the stated problem. Starlike networks have allready been applied to different applications, which are not suitable for interprocess communication systems on a process base but instead useable only to connect physical units like telephones (z.B.: DE 4329172, EP 876067, EP 883310), wireless networks (WO 97/36444), physical subnetworks (U.S. Pat. No. 5,274,631), ATM-networks (DE 19532421/2), network gateways (U.S. Pat. No. 5,596,579), and do not allow—according to the knowledge of the author—multiple independent connections between the same physical units or processes and the central unit or process. In addition, the logical addressability of individual processes or connections independent of the physical identifications of the unit and the local identification of the endpoint is—according to the knowledge of the author—not realized in any prior art network.

The stated problem is solved by a starlike interprocess communication systems according to claim 1, which consists of a central unit executing a central process—called Central Process—and other processes—called Peripheral Processes—running on the central unit or a peripheral unit, where each peripheral unit is physically connected to at least the central unit, and each peripheral process logically connected to the Central Process via one or more standing logical bidirectional communication connections. The Central Process assigns to at least one connection to a peripheral process at least one logical—i.e. not bound to a specific physical unit—identification. Using only this logical identification peripheral processes can communicate via the Central Process with at least one defined peripheral process.

The logical identification(s) according to claim 1 do not necessarily have to characterize a connection or a peripheral process uniquely.

An interprocess communication system according to claim 1 is fundamantally different from prior art computer and/or telephone networks.

In prior art computer networks according to claim 1, especially based on the common IP-protocol, routers or router processes forward messages addressed to a given IP-address to the physical machine or unit uniquely identified by said IP-address. The IP-address is bound to the specific physical machine and therefore cannot be interpreted as logical identification in the sense of this patent. In contrast, logical identifications according to claim 1 identify connections of peripheral processes independently on which physical unit they are being executed and allow therefore the communication between peripheral processes independently of the physical locations where they are being executed (i.e. the logical communication between peripheral processes).

In the case of the well known TCP/IP-protocol based on the IP, the local port address of TCP/IP-server process comes closest to a logical identification according to claim 1. But a network wide unique identification of a given TCP/IP-server process requires in addition the IP-address of the physical machine executing said TCP/IP-server process. In explicite, TCP/IP requires the vector (IP-address, port-address) to uniquely identify a given TCP/IP-server process. Because of the required IP-address this vector is bound to the respective physical machine executing the TCP/IP-server process and therefore cannot be interpreted as logical (i.e. independent of the physical location) identification in the sense of this patent.

EP 0 705 463 B1 describes a system and method to establish telecommunication connections between participants and subscribed merchants in a network. The network comprises a central processing unit with a central program and terminals of endusers and subscribed merchants able to connect to the central unit via telephone lines.

Prior art telephone networks of any kind, in particular telephone networks according to EP 0 705 463 B1 or ISDN, establish direct physical connection between the communication partners. A direct physical connection between the peripheral units of an interprocess communication system according to claim 1 is at no time required nor at any time established. Therefore an interprocess communication system according to claim 1 is fundamentaly different from prior art telephone networks.

To communicate in a network according to claim 1 it is sufficient, that a peripheral unit executing a peripheral process participating in said interprocess communication system only is physically connected to the central unit. This means that an interprocess communication system according to claim 1 also allows the communication between peripheral processes in different, physically disjoint physical networks, as long as the central unit is physically connected to both physical networks (e.g. via two independent network interfaces comparable to a gateway or firewall).

The necessity of prior art telephone networks to establish direct physical connection has as consequence, that a telephone switching unit can only establish a certain number of parallel connections, limited by its physical resources (i.e the number of independent parallel switches).

An interprocess communication system according to claim 1 never switches physical connections—hence the name "Interprocess Communication System"—such that the maximum number of potential connections is only limited by the memory capacity and the execution speed of the central unit.

An interprocess communication system according to claim 1 is also fundamentally different from prior art virtual private networks, which mainly consist of physical hardware components together with some data encryption hardware or software to comb guarantee the privacy of the connection and data transmission between two prior art processes following the traditional client/server principle. Typically the software components of virtual private networks are located below TCP/IP and do not affect layers higher than 2 of the ISO/OSI model. In contrast, an interprocess communication system according to claim 1 is typically located above layer 3 of the ISO/OSI model (i.e. above TCP/IP), because it requires a reliable logical message transmission between the Peripheral Processes and the Central Process.

An interprocess communication system according to claim 1 is also fundamentally different from networks providing access to the internet by assigning temporary IP-adresses to temporarily connected computers (i.e. via a modem). Fixed or temporary IP-addresses identify individual machines or peripheral units and not peripheral processes or connections of peripheral processes in the sense of claim 1.

A special example of an interprocess communication system according to claim 1 is given in FIG. 1. It consists of a central unit ZE and three peripheral units PE1–PE3, which peripheral units are connected to the central unit via the physical connections V1–V3. The central unit executes Central Process Z and one peripheral process P1, unit PEI executes the peripheral processes P2–P4, unit PE2 peripheral processes P5 and P6 and unit PE3 peripheral processes P7 and P8. The peripheral processes P2, P4 and P8 are connected via one, P1 and P3 via two, P5 via three and P7 via four standing logical communication connections to the Central Process.

Special realizations of an interprocess communication system according to claim 1 include also the case that all processes are executed on the central unit alone.

The specific advantages of an interprocess communication system according to claim 1 are:

1. The peripheral processes need only one connection to the Central Process and the logical identification to communicate indirectly via the central process with other peripheral processes.
2. Each peripheral process can communicate with more than one other peripheral process at the same time without additional connections.
3. The communication is independent of the unit(s), which execute(s) the peripheral processes. The peripheral processes do not need to know the physical units or local endpoints of their communication partners.
4. The number of standing logical communication connections increases only linearily the number of peripheral processes.
5. All messages have to pass through the Central Process. The Central Process can monitor the activity in the network on a logical level, can log the complete history in chronological order and can block unauthorized messages.
6. The fastest transmission of messages from one peripheral process to another is guaranteed, because only standing connections are utilized. This eliminates deadtimes due to connection build-up and build-down so that a peripheral process only needs to send a single message to the Central Process and the Central Process to direct the message to the recipient.

Claims 2 to 8 characterize the build-up of a connection between the Central Process and the peripheral processes.

In an interprocess communication system according to claim 2 the Central Process is able to accept incoming connection requests and provides at any time at least one unused endpoint. The central unit needs to be identified by a unique physical—i.e. bound to the physical unit—identification and the endpoint by a logical identification, which is at least unique on the central unit, so that peripheral processes which can initiate connections are able to uniquely address and build-up a connection to the unused endpoint. All peripheral processes able to initiate a connection need the knowledge of the physical identification of the central unit and the local identification of the unused endpoint and initiate the build-up of a connection.

Figure 2:
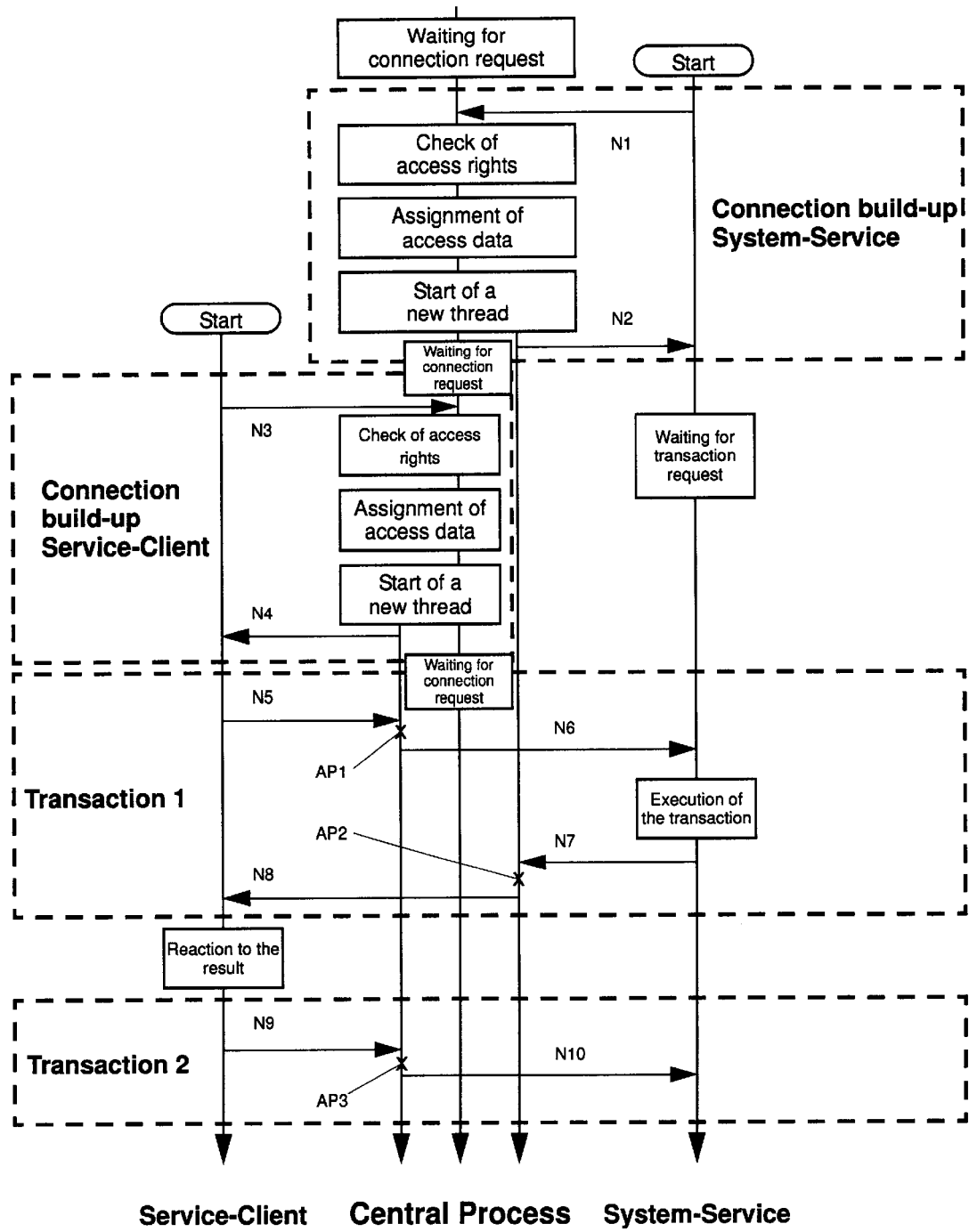
FIG. 2: illustrates the timing of the connection build-up and one example transaction in an interprocess communication system according to claim 2.

The upper half of FIG. 2 labeled with ("Connection build-up System-Service" and "Connection build-up Service-Client") gives an example of the timing for a connection build-up of two peripheral processes—called System-Service and Service-Client—in an interprocess communication system according to claim 2. At the beginning the Central Process provides in its main thread an unused endpoint and waits for an incoming connection request. A peripheral process requests a connection to the Central Process (N1 & N3). The Central Process checks the access rights of the peripheral process, and assigns—after a positive result of this check—specific access data to the connection, starts a new thread to handle all further communication of the connection and ends the connection build-up with the transmittance of the access data to the peripheral process (N2 & N4). In parallel, the main thread creates a new connection endpoint with the same local identification as the previous endpoint and waits for the next connection request, such that the next peripheral process (Service-Client) can build-up a connection to the Central Process in the same way. If the check of the access rights turns out to be negative the Central Process terminates the connection build-up and no connection is established.

In an interprocess communication system according to claim 3, at least one peripheral process is able to accept an incoming connection request and provide at least one unused connection endpoint. The Central Process is able to initiate connections to peripheral processes able to accept incoming connections. The unit executing a peripheral process able to accept an incoming connection request needs to be identified uniquely in the whole network and the endpoint provided by the peripheral process needs to be identified by a local identification unique on the unit executing said peripheral process. Both the identification of the unit and the endpoint need to be known by the Central Process in order to uniquely address and buildup a connection to the peripheral endpoint.

Figure 3:
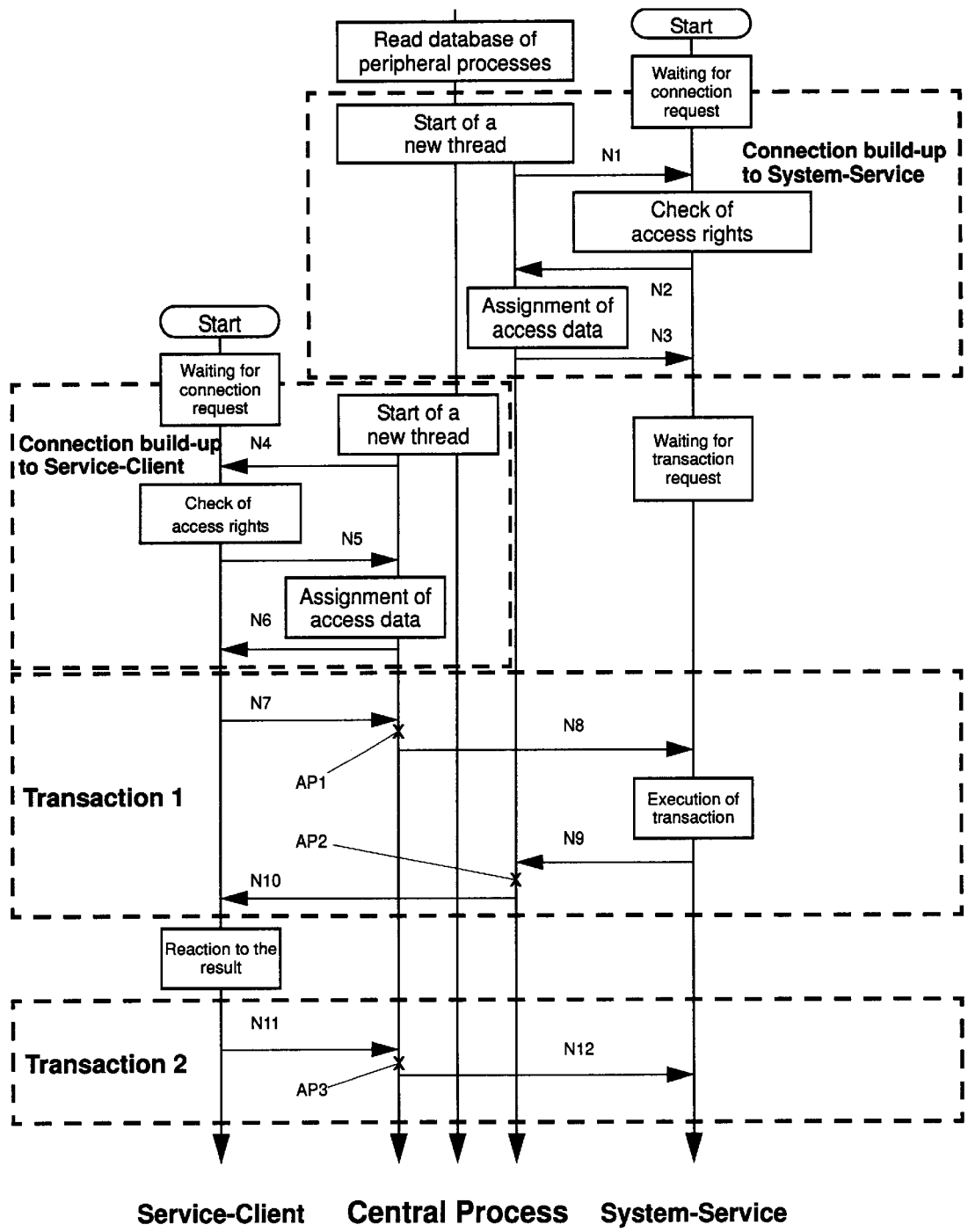
FIG. 3: illustrates the timing of the connection build-up and one example transaction in an interprocess communication system according to claim 3.

The upper half of FIG. 3 labeled with ("Connection build-up to System-Service" and "Connection build-up to Service-Client") gives an example of the timing for a connection build-up to two peripheral processes—called System-Service and Service-Client—in an interprocess communication system according to claim 3. At the begin the Central Process reads all physical and local identifications from a data base to which he should build-up a connection. For each connection the Central Process starts a new thread, which thread sends a connection request to peripheral process (N1 & N4). The peripheral process provides a uniquely identified endpoint and waits for an incoming connection request. After reception of an incomming connection request the peripheral process checks the access rights of the Central Process. If this check turns out negative the peripheral process terminates the connection build-up and no connection is established. If the access check turns out positive, the peripheral process accepts the connection request (N2 & N5) and finally receives the access data from the Central Process (N3 & N6). The connection build-up to other peripheral processes follows the described scheme, where the threads in the Central Process can be executed concurrently.

In no interprocess communication system according to claim 2 or 3 exists the possibility of a direct communication between the peripheral processes, if all peripheral processes are only able to initiate connections to the Central Process or to accept connections from the Central Process.

Claim 3 also includes the case that all peripheral processes are able to accept connections from the Central Process as well as the case that only some peripheral processes are able to accept connections from the Central Process and other peripheral processes are able to initiate connections to the Central Process. In both cases the Central Process builds up by itself only connections to peripheral processes which are able to accept connections from the Central Process.

The advantages of an interprocess communication system according to claim 2 are that the access check is performed by the Central Process and that there exists only a single entrance to the whole system, which entrance is a) uniquely localized, b) can be monitored very efficiently and c) can be secured with relatively small effort. On the other hand in an interprocess communication system according to claim 3 each peripheral process able to accept a connection performs his own access check. In addition, more system entrances significantly increase potential security hazards.

In an interprocess communication system according to claim 2, the peripheral units do not need to be identified uniquely within the whole network. If a peripheral unit is not uniquely identified in the whole system no additional constraints on the access rights regarding the unit executing a peripheral process can be imposed. This disadvantage is solved by an interprocess communication system according to claim 4.

In an interprocess communication system according to claim 5, the logical identification, which the Central Process assigns to a peripheral process during connection build-up, is unique for each peripheral process which connects to the Central Process. This opens the possibility for peripheral processes to communicate with other uniquely determined peripheral processes. In this case, all connections of a peripheral process to the Central Process receive the same logical identification. This feature is very usefull, if a peripheral process needs to transmit data to a unique peripheral process regardless of the exact transmission path.

In an interprocess communication system according to claim 6, the Central Process assigns a unique logical identification to each connection of a peripheral process during connection build-up. This opens the possibility for peripheral processes to communicate with uniquely determined connections of other peripheral processes. This feature is very usefull in cases when a peripheral process has multiple connections with different functionality to the Central Process and another peripheral process needs the functionality of an individual connection. The unique logical addressability of individual connections becomes very important, for example, in claim 11.

An interprocess communication system according to claim 7 allows modification of the access rights during system operation, where existing connections need to fullfill the new access rights or otherwise are terminated and new connections accepted or build-up automatically according to the new access rights. Also in this case an interprocess communication system according to claim 2 is advantageous compared to a system according to claim 3, because in the former case (claim 2) the access rights need only to be updated in the Central Process where in the latter case (claim 3) the access rights need to be transmitted to all peripheral processes able to accept a connection from the Central Process.

Claim 8 covers the case of a connection break down between the Central Process and a peripheral process. Broken connections are reestablished automatically as soon as possible from the appropriate side (connection initiating peripheral processes and connection initiating Central Process). This assumes that the respective processes are able to detect broken connections and that the requirements to reestablish a broken connection are given. The detection of a broken connection can be as simple as the analysis of error situations during data transmission or by active supervision in a separate thread, which checks the connection status at regular intervals. The restoration of the system state necessary to reestablish a broken connection can be initiated automatically by the system (see also claim 11) or by manual operator action(s).

Claims 9 and 10 concern the method of message transmission by the Central Process. In tan interprocess communication system according to claim 9, a peripheral process (Sender) adds to a message the logical identification of at least one connection of a peripheral process (recipient) and sends the message together with all identifications of the recipients to the Central Process. The Central Process analyzes the message according to its quality and the recipient identifications and forwards the message after positive authorization check(s) to all specified and authorized recipient connections. The logical identifications do not necessarily have to specify a given recipient connection uniquely. If the logical identifications are not unique, then the Central Process forwards the message to at least one connection with the given logical identification. Additionally, the recipients may also contain the logical identification of the sending connection, in which case the Central Process forwards the message back to the sender (loop-back). Loop-back messages are, for example, important for guard processes (claim 11) to test the functionality of the Central Process.

Claim 9 also specifies how the Central Process handles messages which do not contain any logical recipient identifications. A Central Process according to claim 9 can also add the logical identification of the sender to the message before forwarding. The recipient receives the logical identification of its sender together with the message which enables the recipient to reply to the sender. Claims 9 and 10 also define how the Central Process handles messages when the authorization check turns out negative (claim 9), messages which are addressed to temporarily unavailable recipients (claim 10) and how the Central Process informs the sender to which recipient connections a message has been successfully delivered, or to which recipient connections a message could not be delivered (claim 9).

Claim 11 characterizes special peripheral processes—called System-Services, System-Clients and Guards—with connections of different functionality independent of the connection build-up scheme. The interaction between System-Services and system-clients is based on so-called transactions, consisting of a transaction request from the Service-Client via the Central Process to the System-Service, the requested action performed by the System-Service and a potential transaction result transmitted from the System-Service via the Central Process to the Service-Client. System-Services act passively in the sense that they initially wait for incoming transaction requests, execute the requested action, and potentially send the transaction result back to the Service-Client and finally wait for the next incoming transaction request. Service-Clients, on the other hand, play the active part in the sense that they initiate transactions by sending requests to System-Services, wait for the potential transaction result, and initiate further transactions independently of the transaction result and their individual tasks.

Claim 11 also describes special peripheral processes—called Guards—, which monitor other system components and react to detected faults with appropriate emergency tasks to automatically correct the fault or to alert other peripheral processes or system operators. A guard, which checks, for example, the functionality of the Central Process using loop-back messages, can detect faulty behavior of the Central Process and can correct the situation by terminating and restarting the errant Central Process. Guards implemented as Service-Clients can also supervise important System-Services by defined test transactions and, in case of an error, terminate and restart the errant System-Service, if necessary on a different unit.

Figure 4:
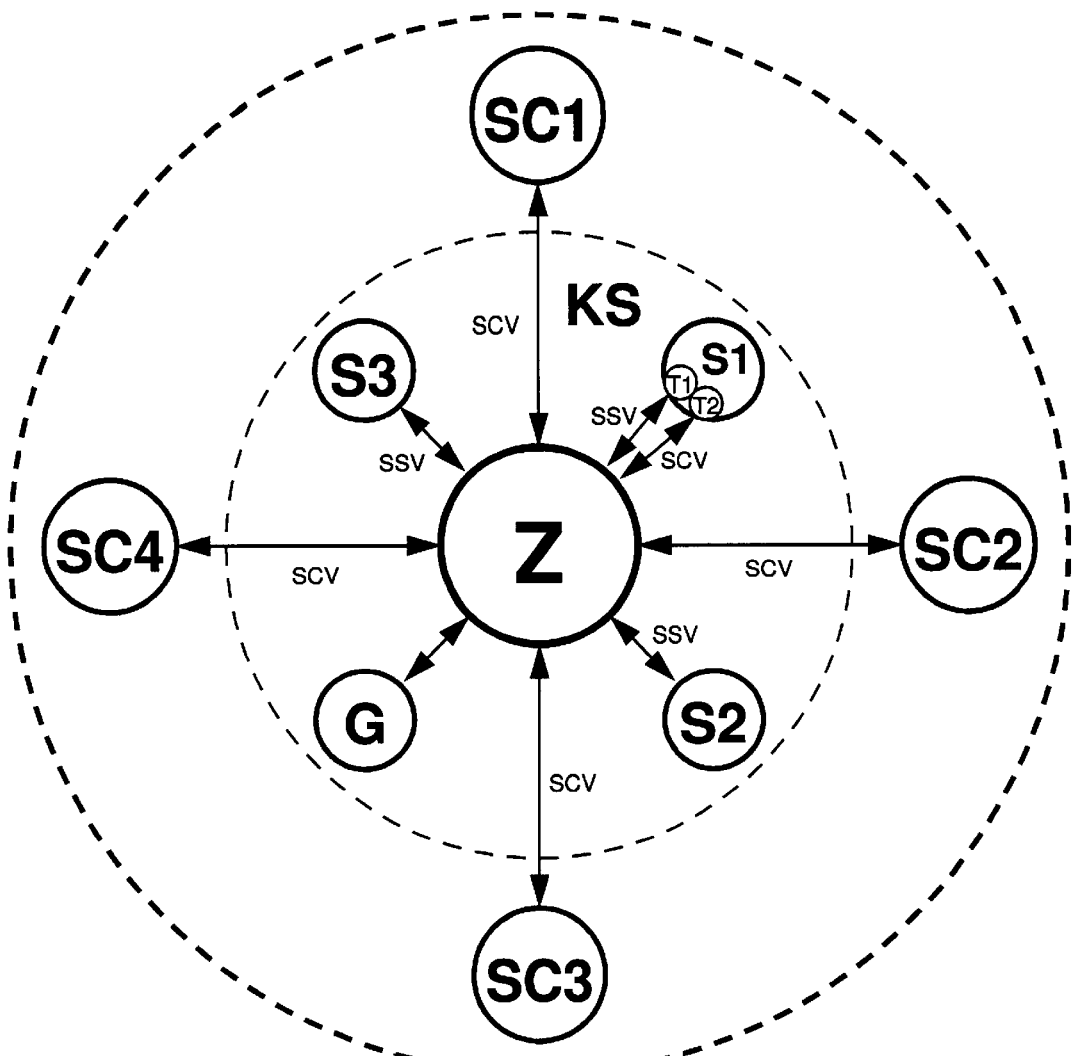
FIG. 4: illustrates an interprocess communication system according to claim 11 with one Guard, three System-Services S1–S3, four Service-Clients SC1–SC4. System-Service S1 maintains a System-Service connection SSV and a Service-Client SCV connection to the Central Process Z in two separate threads T1 and T2.

FIG. 4 illustrates an example of a network according to the claim 11. The Central Process Z is connected with three System-Services S1–S3, one guard G and four Service-Clients SC1–SC4. All Service-Clients, the guard and the System-Services S2 and S3 are implemented according to claim 11. System-service S1 also follows claim 11, but maintains concurrently in thread 1 a System-Service connection (SSV) and in thread 2 a Service-Client connection SCV to the Central Process. The Central Process, the guard, and the System-Services together form the kernel system (KS). From the viewpoint of a Service-Client, the kernel system is a "black-box", which provides the functionality of the System-Services after the Service-Client has established a successful connection to the Central Process.

The transaction timing in an interprocess communication system according to claims 2 and 11 is illustrated in the lower part of FIG. 2 ("Transaction 1" respective first part of "Transaction 2"). The Service-Client sends a transaction request together with the logical identification of the System-Service to the Central Process (N5 & N9). The Central Process receives the request in the thread started for the Service-Client and forwards the request after a positive authorization check (AP1 & AP3) to the addressed System-Service (N6 & N10). The System-Service recieves the request, executes the requested action, and sends the result of the action together with the logical identification of the Service-Client to the Central Process (N7). The Central Process forwards the result after another potential authorization check AP2 to the Service-Client. The transaction terminates with the reception of the transaction result by the Service-Client. The Service-Client reacts to the result and initiates the next transaction ("Transaction 2"). FIG. 2 only contains the first part of transaction 2 to illustrate the time sequence of transactions.

The transaction timing in an interprocess communication system according to claims 3 and 11 does not differ from the transaction timing described above (refer also to the lower part of FIG. 3 "Transaction 1" and first part of "Transaction 2"). Here, N7 and N11 refer to the transmission of the transaction request from the Service-Client to the Central Process, N8 and N12 to the forwarding of the request to the System-Service, N9 the transmission of the transaction result to the Service-Client and, AP1–AP3 refer to the authorization checks before the forwarding of the messages by the Central Process.

The destinction between active (Service-Clients) and passive (System-Service) peripheral processes serves to avoid dead locks, which may occur, for example, when a process recieves a transaction request while waiting for the result of a self-initiated transaction. In this context, the combination of a System-Service and a Service-Client in a single peripheral process (claim 11) is of great importance: If a System-Service needs information from another System-Service it is advantageous to isolate the transactions with other System-Services into separate threads in which the System-Service connects to the Central Process as Service-Client(s). This assumes that the Service-Client connections of the System-Service are identified by different logical identifications within the Central Process to be distinguishable for potential senders. These simple and efficient means in advance avoid potential dead-locks, timing problems and misinterpretations of incoming messages.

System-services according to the described claims have the following very important advantages compared to traditional services following the client/server principle:

1. A System-Service needs only a single connection to the Central Process.
2. System-services are only accessable indirectly via the Central Process allowing the Central Process to completely monitor the network traffic and to block unauthorized transaction requests, making firewalls essentially superfluous.
3. A System-Service is not bound to a specific unit or a specific connection endpoint and can be addressed instead only by its logical identification.
4. The administration of logical identifications is performed by the Central Process and does not require additional transactions by the Service-Client, eliminating explicite name resolution transactions via Network-Information-, Directory- or similar services.
5. A System-Service can be replaced by another similar System-Service running on the same or a different unit transparently for a Service-Client.
6. The availability of the kernel system can be increased by redundant System-Services (see also below and claim 13).
7. With a single connection to the Central Process a Service-Client has the possibility to transact with all System-Services connected to the same Central Process, eliminating the frequent and time consuming connection build-up and build-down as well as the maintainance of several parallel connections to multiple traditional services.
8. Each transaction requires only four messages to be transmitted via the physical network, which reduces the transaction time dramatically compared to traditional systems.

The latter advantage can become a disadvantage compared with direct communication in traditional client/server systems if large messages need to be transmitted and the physical network architecture is not optimal, because—neglecting the connection build-up and build-down—traditional client/server systems only need to transmit two messages per transaction.

In all interprocess communication systems according to all discussed claims the Central Process is, like in any other starlike architecture, a single point of failure, i.e. a failure of the Central Process results in a complete system failure. On the other hand, the failure of one or more System-Service(s) results only in a failure of partial system-functions of the kernel system. But interdependencies between System-Services can result in additional failures of otherwise still functional components. The failure of both a Central Process and the failure of a System-Service cannot be accepted for mission critical applications. An significant improvement of the overall system reliability can be achieved by redundant Central Processes (claim 12) or redundant System-Services (claim 13).

An interprocess communication system according to claim 12 has two or more redundant Central Processes, to which the peripheral processes can build-up parallel connections. Upon failure of one of the Central Processes the peripheral processes switch their information flows immediately to the other Central Process so that the system can continue without dead time. After recovery of the failed Central Process, all peripheral processes reestablish their connections to the recovered Central Process after the system reaches its initial state again.

Figure 5:
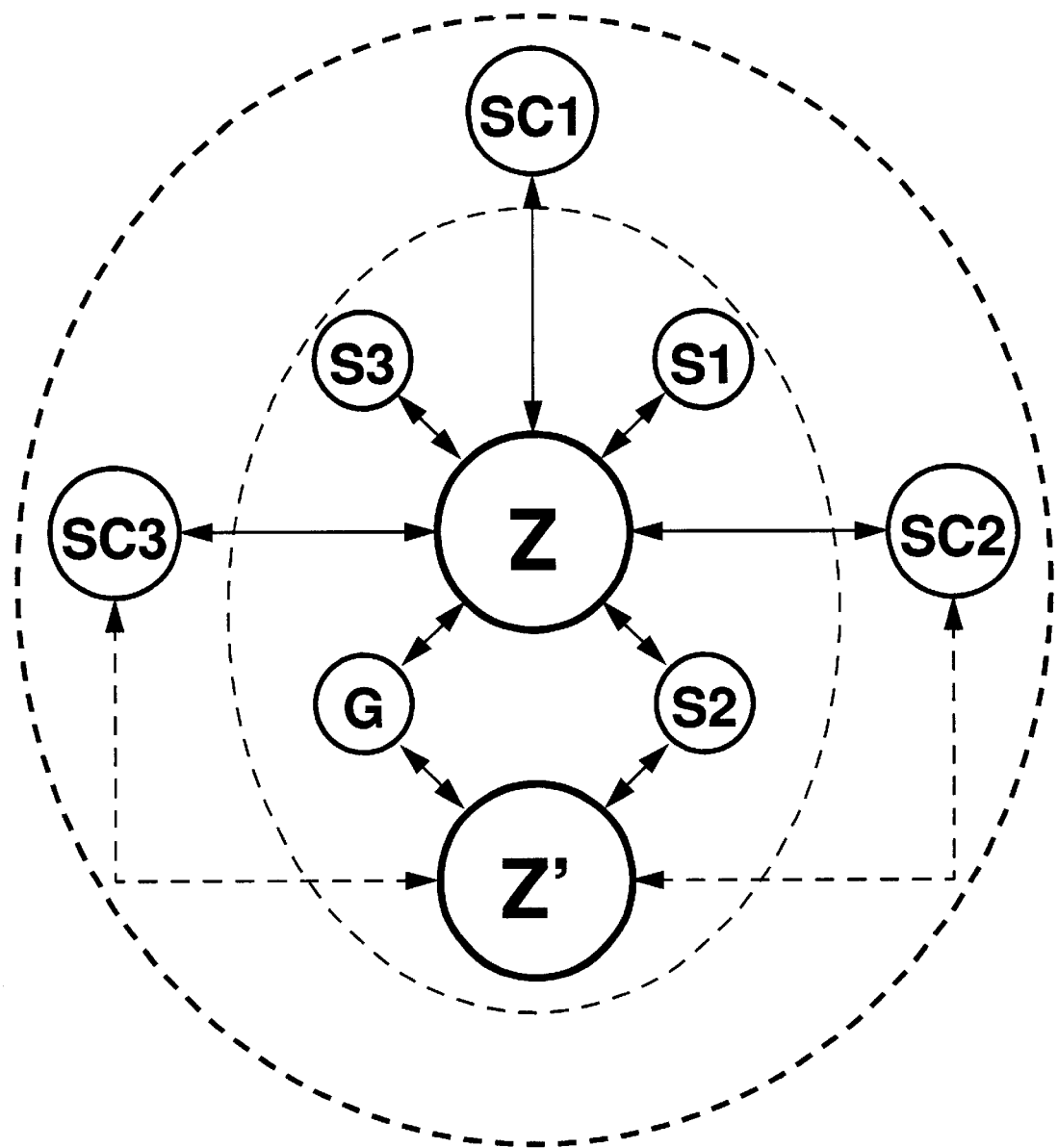
FIG. 5: illustrates a n interprocess communication system according to claims 2 and 12 with two redundant Central Processes Z and Z'.

FIG. 5 illustrates an example of an interprocess communication system according to claims 2 and 12. Central Process Z is the primary Central Process in the System, Central Process Z' runs as backup parallel to Z. Both Central Processes are supervised by guard G and restarted in case of failure. System-service S2 maintains parallel connections to Z and Z'. Service-Clients SC1 & SC3 direct their traffic initially exclusively via Z, upon failure of Z automatically switch to Z' and continue without dead time to communicate with System-Service S2. System-services S1 & S3, on the other hand, do not maintain connections to Z' and cannot be reached after a failure of Z. Guard G detects the failure of Z and restarts Z. As soon as Z becomes available again guard G, S1–S3 and SC1–SC3 reestablish their connection to Z and the system reaches its initial state again. Service-client SC1 is only connected to Z and upon failure of Z cannot communicate with any other peripheral process untill Z becomes available again and all connections to Z have been reestablished.

Claim 13 characterizes an interprocess communication system with redundant System-Services to increase the reliability. In such a system, multiple System-Services of the same kind can be connected with one or more Central Processes. Each Central Process assigns to all connected System-Services of the same kind the same logical identification—called Service-Identification—. If a Service-Client sends a transaction request to a service-identification, the Central Process decides to which System-Service the request will be forwarded and how the transaction result should be determined.

To determine the transaction result in a system with redundant System-Services several strategies can be used (claims 14 and 15):

1. Each Central Process forwards the transaction request to exactly one of the addressed and connected System-Services, the System-Service executes the transaction and replies a potential result to the Service-Client.
2. Each Central Process forwards the transaction request to at least one of the addressed and connected System-Services. In this case each System-Service to which the request has been forwarded replies with a preliminary potential result to the Central Process.
3. Each Central Process forwards the transaction request to all addressed and connected System-Services and assigns one System-Service to be a Master-System-Service, that alone sends a potential transaction result to the Service-Client.

From a plurality of individual results of redundant System-Services a final result can be determined by 1. the majority—i.e. more than 50% of the System-Services report the same result—, and, if no majority is obtained, determined to be "undefined", or by
2. the most frequent reported individual result and, if more than one individual result is are reported with the same frequency, determined to be "undefined".

The determination of the final result from a plurality of individual results can be performed either by the Central Process or the Service-Client.

In case of redundant System-Services it is especially advantageous if the transaction results do not depend on internal data of a System-Service determined by previous transactions. In such cases it is not important which of the redundant System-Services executes the transaction.

If the transaction result depends on internal data of the System-Service, which data potentially results from previous transactions, the internal data of all redundant System-Services need to be synchronized. Otherwise redundant System-Services of the same kind can produce different results for the same transaction and one of the redundant System-Services cannot replace the other.

The process of synchronization of internal data of redundant System-Services are covered by claim 15. For this purpose the Central Process forwards all transaction requests to all addressed redundant System-Services and the System-Services update their internal data. This guarantees the synchronous sequential update of the internal data of redundant System-Services, but does not guarantee that the internal data of redundant system services is really identical, because the System-Services may have started initially with different data sets or missed one or more transaction requests, for example during a temporary failure. Only the direct synchronization of the internal data between a master- and background-System-Services guarantees that all redundant System-Services of the same kind operate with the same internal data at a given time. In addition to the synchronous sequential updates a regular data synchronization, for example during a quite period, is advantageous for data consistency at all times over longer periods. Both the punctual complete data synchronization and the synchronous sequential updates are important requirements to guarantee that redundant System-Services with internal data can be exchanged at any time.

Master-System-Services are valid only for a single connection to a given Central Process. If a System-Service is connected to multiple Central Processes, it is possible for him to be a master on one connection to one Central Process while being a background-System-Service on another connection to another Central Process.

If a master System-Service fails the Central Process automatically activates one of the Background-System-Services of the same kind as the errant master to become the new Master-System-Service. This activation is completely transparent to Service-Clients and practically without dead time. After restart of the errant System-Service the restarted System-Service connects on to all previous Central Processes to which it was connected before his failure. If at that time no other Master-System-Service of the given kind is connected to a given Central Process the reconnection will be in master, otherwise in background mode. Finally the system has recovered completely to its prefailure configuration.

Alternatively to the described synchronization of the internal data of redundant System-Services, the data can be stored outside the System-Service in a location accessible to all redundant System-Services. This could be, for example, a permanent storage medium or another System-Service. In such cases the redundant System-Services can be treated like System-Services without internal data.

Figure 6:
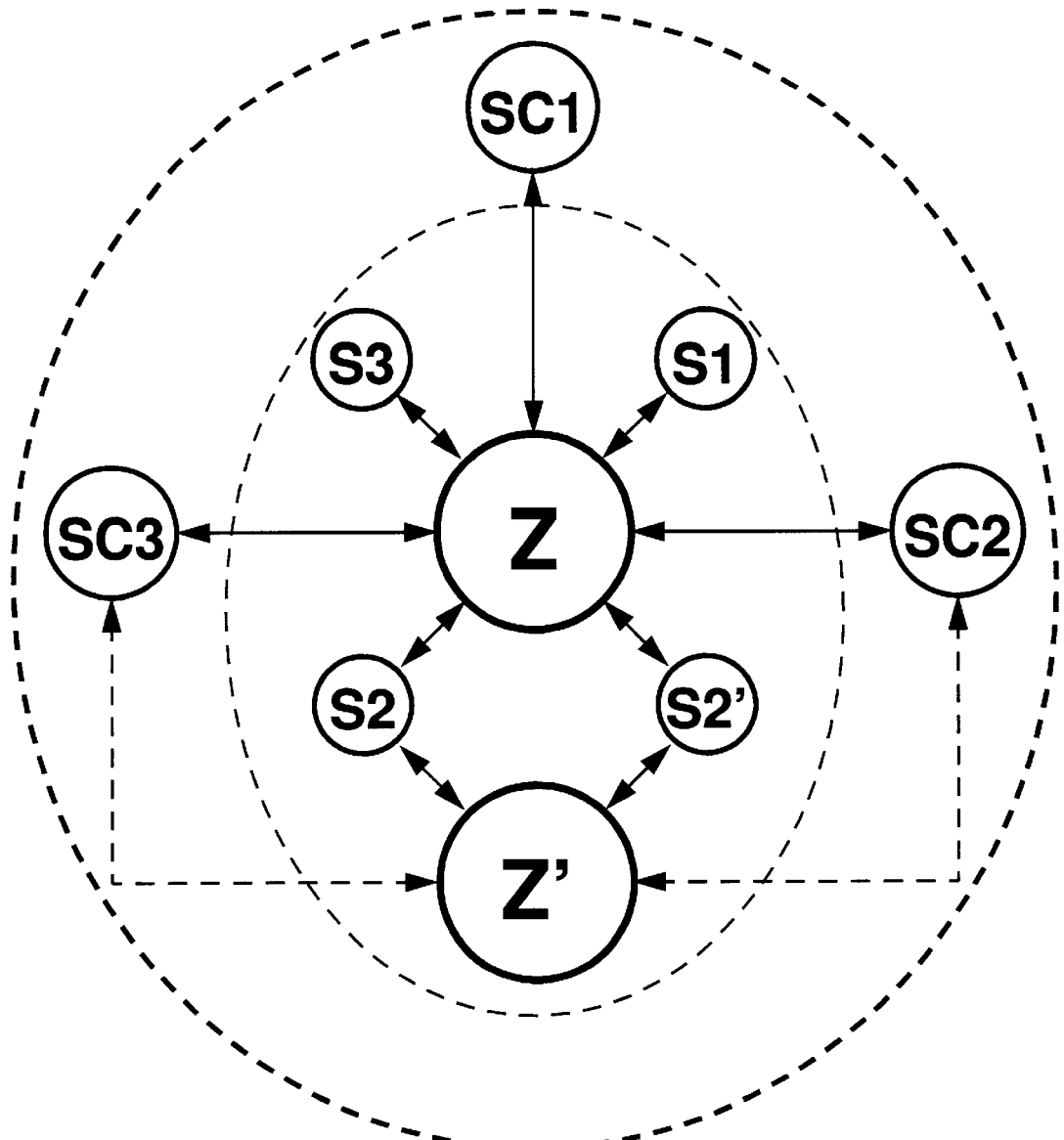
FIG. 6: illustrates an interprocess communication system according to claim 13 with two redundant System-Services S2 and S2'.

FIG. 6 shows a special implementation of an interprocess communication system according to claim 13. In this system two System-Services of the kind S2 are running in parallel (S2 and S2'). Both connect to Central Process Z and its backup Z' and obtain the service identification S2 from both Central Processes Z and Z'. During normal operation Z forwards all transaction requests addressed to "S2" to S2. Upon failure of S2 all transaction requests are automatically redirected to and executed by S2'. After restart S2 reconnects to Z and Z' and all transactions can be directed to S2 again. This example also survives the failure of Z and S2 at the same time, because Z' and S2' are immediately available alternatives. This does not hold for System-Services S1 and S3, because both are not connected to Z' and cannot be reached after a failure of Z.

The maximum number of peripheral processes simultanuously connected to a given Central Process is at least limited by the system resources available to the central units (like memory capacity or maximum number of connection endpoints). If more peripheral processes are required than a single Central Process can handle, multiple interprocess communication systems with their own Central Processes can be executed in parallel. Nevertheless, such configurations are not complete systems but instead sets of independent individual systems which cannot communicate between each other.

Claims 16 to 22 describe interprocess communication systems consisting of at least two subsystems linked together to an arbitrary topology. The Central Processes—called Subcentrals—can be connected directly or indirectly via specialized peripheral processes—called Links—(claim 16). Claims 17 and 18 concern the unique identification of the Subcentrals or Links and peripheral processes in a system build of several subsystems and the forwarding of messages from the subsystem of the sender to the subsystem of the addressee, claim 19 the criteria—called politics—determining the authorization of message forwarding between different subsystems, claim 20 the possibility that a peripheral process is simultanuously connected to multiple Subcentrals of different subsystems.

Only an interprocess communication system with direct or indirect connections between the Subcentrals of different subsystems allows the peripheral processes of different subsystems to communicate with each other. The kind of logical networking of the subsystems (logical topology) can be freely chosen within the constraints of the physical resources of a given Central Process and be adapted to the special requirements of the application. The logical topology together with the transmission politics of the individual Links or Subcentrals defines which messages may be transmitted from which peripheral process of one subsystem to which peripheral process of another subsystem.

The forwarding of messages to recipients in other subsystems than the subsystem of the sender assumes that the recipients can be uniquely specified by the sender. Because the logical identifications of the peripheral processes or their connections are according to claims 2 to 15 only valid for a given Central Process, the unique addressability of all peripheral processes within a system composed of different subsystems can be obtained only by additional means. For this purpose different methods can be applied, which also determine or depend on the forwarding mechanism of the messages between the subsystems:

1. Each Subcentral has a locally unique identification, which is at least unique for all directly or indirectly connected Subcentrals. In this case a path between sender and recipient is uniquely determined by the series of Subcentrals via which the message has to be transmitted from the subsystem of the sender to the subsystem of the recipient (claim 17). Better, but not necessarily required, is where the identifications of each Subcentral are unique within the whole network.

If additionally, network wide unique logical identifications—called peripheral identifications—have been assigned to each peripheral process or connection, each Subcentral can store a routing database, which assigns to each peripheral identification the path to the respective Subcentral. In this case the sender only needs to specify the peripheral identification of the recipients and the Subcentral of the sender can transform the peripheral identification of the recipients via its routing database into real paths and forward the message to the recipients via the determined paths.

2. Each Link posseses a locally unique identification, which is at least unique at those Subcentrals to which the Link directly connects, and each Link connects exactly two Subcentrals with each other (claim 18). A local unique identification of the Subcentral or a globally unique identification of the Link is not required, because each Link transmits messages from one Subcentral to the (uniquely determined) other Subcentral to which the Link connects. In this case, the path between sender and recipient is uniquely determined by a series of the Link identifications via which the message needs to be transmitted from the subsystem of the sender to the subsystem of the recipient. If additionally, like in the first case, each peripheral identification is network wide unique, each Subcentral can store a routing database, which assigns to each peripheral identification the path to the respective Subcentral. In this case the sender only needs to specify the peripheral identification of the recipients and the Subcentral of the sender can transform the peripheral identification of the recipients via its routing database into real paths and forward the message to the recipients via the determined paths.

3. Each peripheral identification is by itself unique within the whole network. The peripheral identification does not specify to which Subcentral the recipient is connected and how the Subcentral can be reached from other Subcentrals. Additionally no Link nor Subcentral have been assigned special identifications. In this case the message can only be reliably transmitted to a recipient if the message is sequentially passed to all Subcentrals and each Subcentral forwards the message to all connected recipients, until the message has been delivered to all recipients or has been passed via all Subcentrals at least once. This method assumes that the message reaches all Subcentrals of the whole system at least once after a finite number of forwards. Due to efficiency this method can only be reasonably applied to systems with circular topologies and relatively few subsystems.

The routing databases can also be exchanged between the Subcentrals to update their own routing database according to changes in the system configuration.

For all routing methods mentioned above it is important to note that different possible paths between sender and recipient are in general not equivalent, because they may differ in their length and/or in their transmission policies (claim 19). A message can for example be transmitted via one path while a Link or Subcentral in another path blocks the transmission.

Different paths between the same sender and the same recipient are only equivalent if all transmission politics of all Subcentrals and/or Links of the whole network are identical. In this case known automated routing strategies can be applied, like the shortest path or the shortest transmission time.

Figure 7:
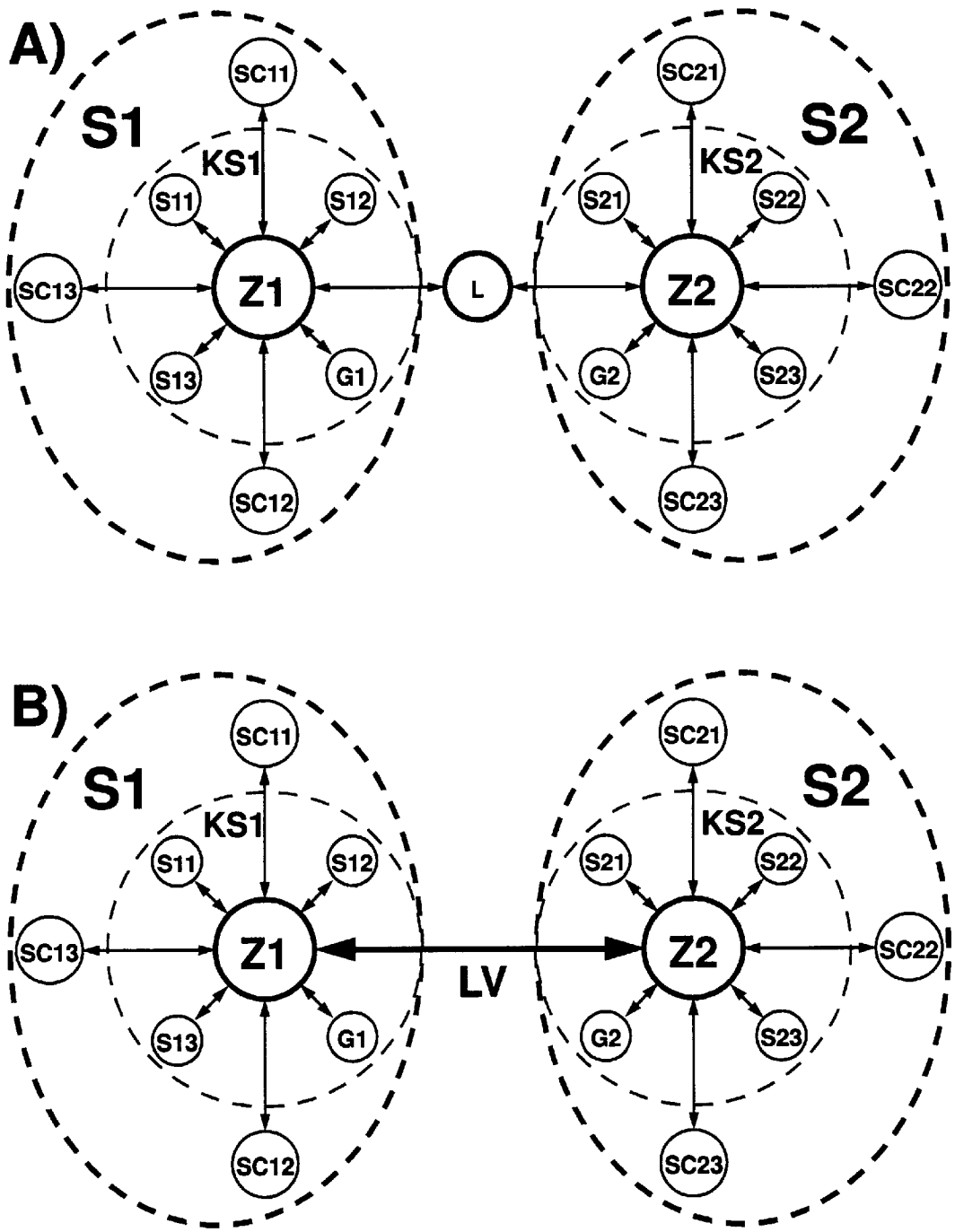
FIG. 7A: illustrates an interprocess communication system according to claim 16 consisting of two subsystems S1 and S2 connected indirectly via Link L.
FIG. 7B: illustrates an interprocess communication system according to claim 16 consisting of two subsystems S1 and S2 connected directly via connection LV.

FIGS. 7 A) and B) show two interprocess communication systems according to claim 16, which consist of two independent subsystems S1 and S2 and are linked by A) a Link and B) a direct connection LV between the Subcentrals, such that peripheral processes of both subsystems can communicate with each other. The other labels of the figures represent in detail: SC11–13 the Service-Clients, S11–S13 the System-Services, G1 a guard and Z1 the Subcentral of system S1, SC21–23 the Service-Clients, S21–S23 the System-Services, G2 a guard and Z2 the Subcentral of system S2. KS1 and KS2 are the appropriate kernels of both subsystems. If the transmission politics of Link L or the Subcentrals permit, Service-Clients SC11–SC13 and System-Services S11–S13 could access System-Services S21–S23. Peripheral processes from subsystem S1 need the logical identification of the Subcentral Z2 in addition to the logical indentification of the target System-Services in subsystem S2 to indicate (A) to Link L to forward the respective messages from Subcentral Z1 to Z2 and (B) to Subcentral Z1 to forward the messages to Z2 directly. This also holds for peripheral processes of subsystem S2 if they need to access System-Services in S1.

In this way process control systems can be divided advantageously into two areas, one fully automatized part with 24 h availability and another—user intensive—part with less demands on the reliability. The user intensive part contains more security risks than the automated part because of more transaction possibilities. Both parts can be realized by two connected subsystems. The intersubsystem connection with their transmission politics guarantees that only authorized users of the user intensive part can transact with authorized components of the automated part. Advantageous are in this context for example the control of important system parameters or the administration of the automated part.

Links and Subcentrals according to claim 16 also have the possibility to build up parallel connection to Subcentrals of more than two subsystems and to connect the subsystems according to their policies. The maximum number of Subcentrals a Link or Subcentral(s) can connect is only limited by the physical system resources of the Link or Subcentral (s).

Figure 8:
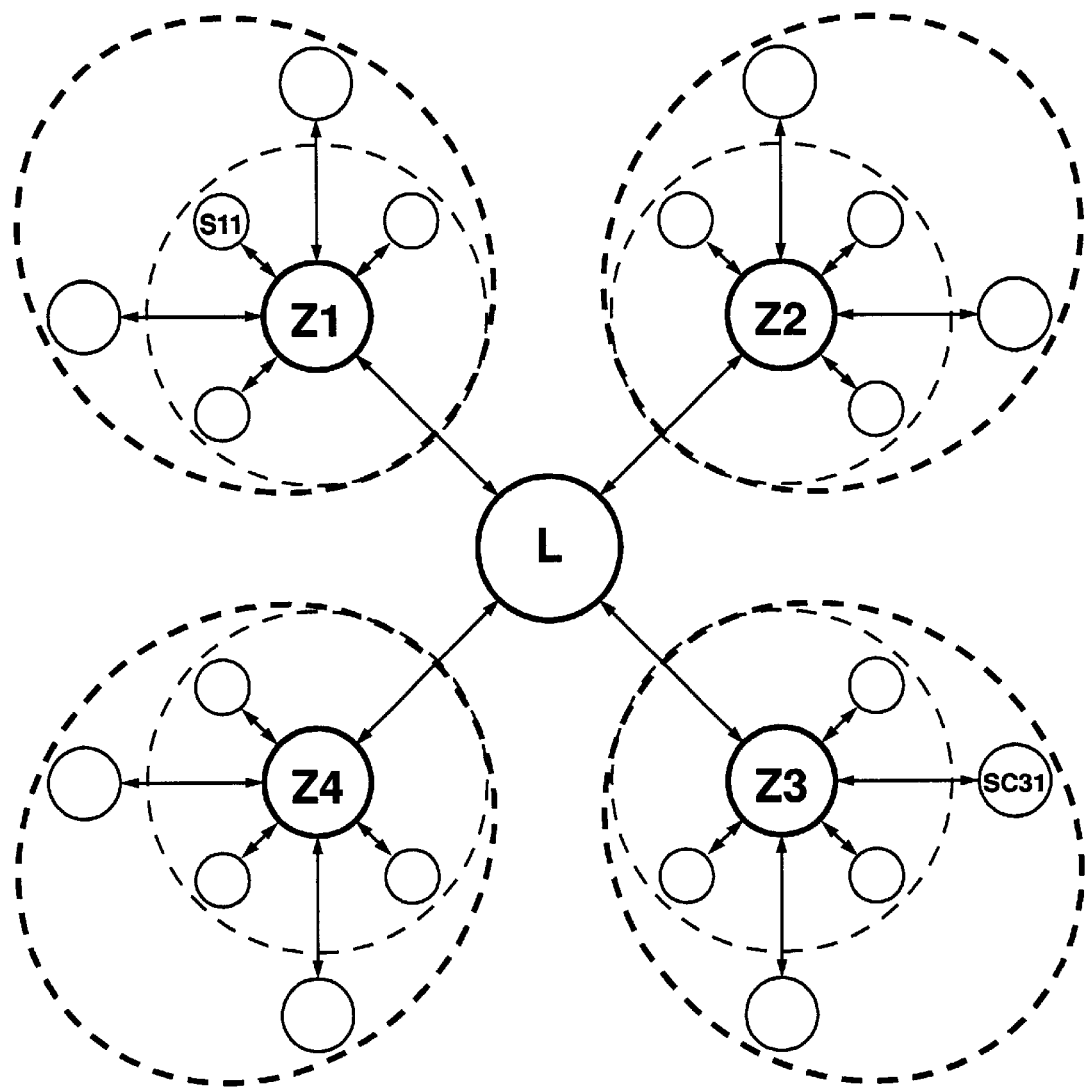
FIG. 8: illustrates an interprocess communication system according to claim 16 consisting of four subsystems connected indirectly via Link L.

FIG. 8 shows an example of an interprocess communication system with a single Link simultanuously connecting four subsystems. Each Subcentral has been assigned by the unique logical identifications Z1–Z4. The Link L informs all Subcentrals which other Subcentrals he can reach. The addressing in this example is given by the unique identifications of the Subcentrals. Service-client SC31 can reach System-Service S11 via path Z3–Z1–S11. Z3 forwards messages with address Z3–Z1–S11 to L, because Z3 knows that Z1 can be reached via L. The Link L forwards the message to Z1 and Z1 finally to S11 together with the sender identification Z1–Z3–SC31. Following the same mechanism S11 reaches SC31 via Z1–Z3–SC31.

The following discussions holds for all interprocess communication systems consisting of several directly or indirectly connected subsystems. For simplicitly the discussion follows the indirect connection via Links but can be transposed to directly connected subsystems where each bivalent Link need to be replaced with a single direct connection and each multivalent Link by several individual direct connections.

If n subsystems need to communicate via a single Link, the Link needs to realize up to 2n unidirectional or n bidirectional connections. For large numbers of subsystems the Link easily becomes a bottleneck. In such cases it is better to replace the Link by several Links with less connections which can be executed on different units and use optimized physical network connections. In the extreme case each Link connects only two subsystems, requirering up to ½n(n−1) different Links to connect all subsystem with each other. The number of required bivalent Links can be reduced by suitable topologies. Circular topologies, for example, allow each subsystem to communicate with every other subsystem but require multiple message forwarding.

Figure 9:
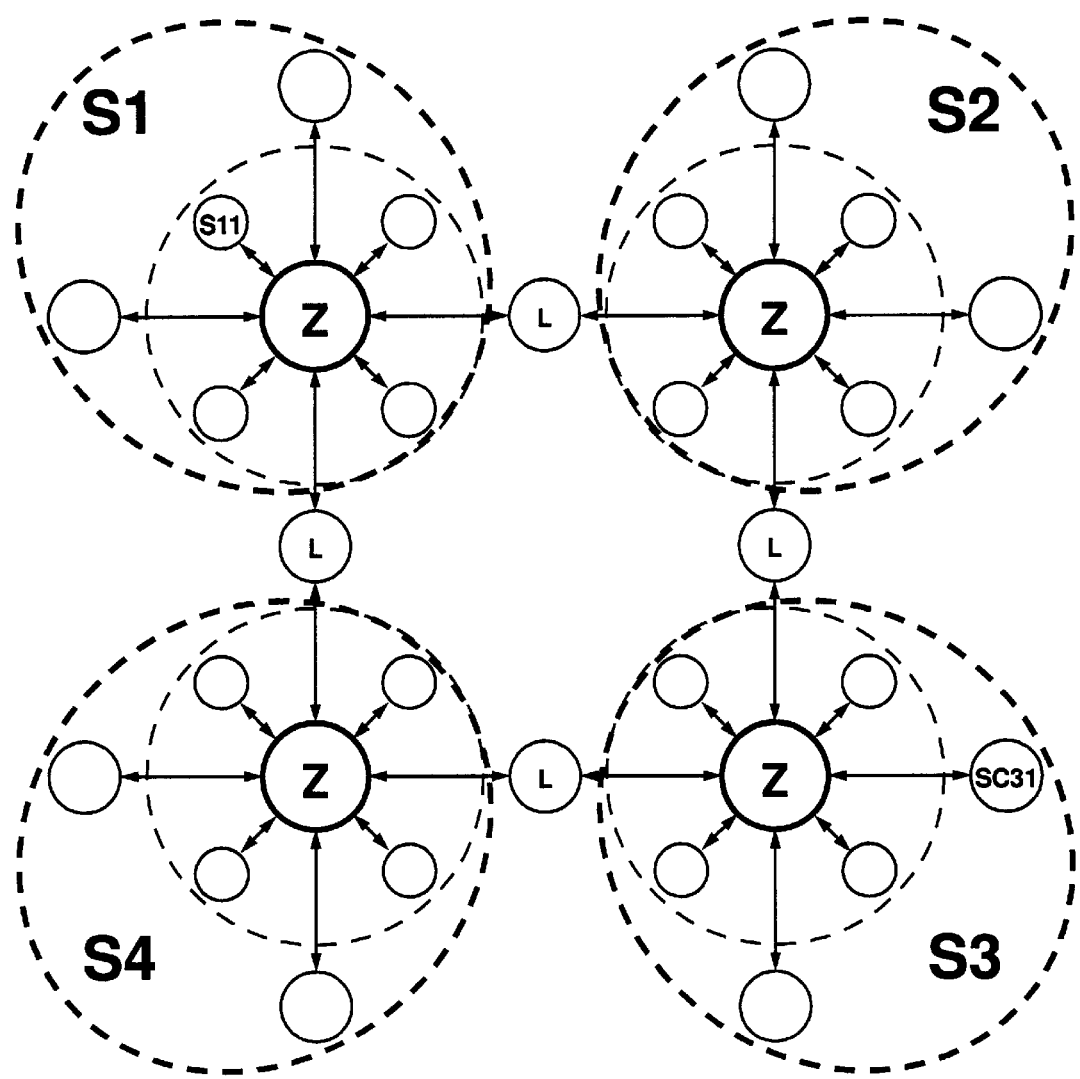
FIG. 9: illustrates an interprocess communication system consisting of four subsystems connected indirectly via four Links L in a circular topology.

FIG. 9 shows an interprocess communication system consiting of four subsystems S1–S4 connected with each other via Links in a circular topology. In this case neither Links nor Subcentrals are uniquely identified. Messages, which SC31 sends to S11, are forwarded by Subcentral of S3 via one of the two Links to the next Subcentral (of subsystem S2 or S4). The Subcentral delivers the message to all addressed local recipients and forwards the message in the same direction to the next Subcentral (of subsystem S1). The latter Subcentral finally delivers the message to S11 and destroys the message, if it does not need to be delivered to further recipients. Messages containing unknown recipients are forwarded until the initial Subcentral (of S3), which directly destroys the message or returns it with all unknown recipients to the sender.

Figure 10:
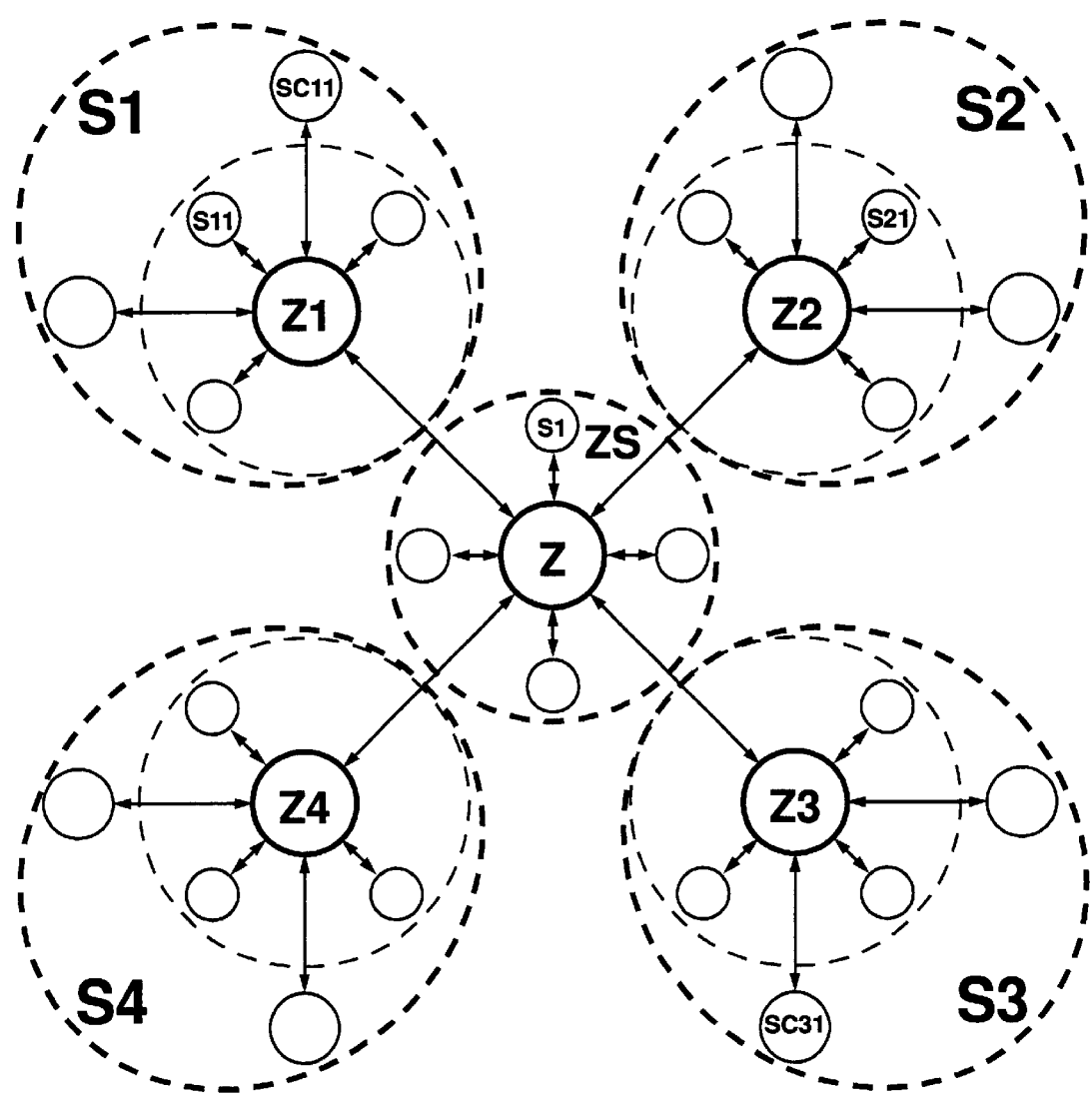
FIG. 10: illustrates an interprocess communication system according to claim 16 consisting of four subsystems S1–S4 connected indirectly via a fifth subsystem ZS.

The minimal number of intersubsystem Links can be achieved with the introduction of additional subsystems in analogy to a starlike topology in the case of intra subsystem communication. FIG. 10 illustrates this technique by an example of four subsystems S1 to S4 connected by a central subsystem ZS. All peripheral processes of all subsystems can be reached via maximal three Subcentrals. The central subsystem is logically on a higher level than the periperal subsystems S1–S4 because all peripheral processes of ZS can reach all other peripheral processes via maximal two Subcentrals. SZ is not only limited to direct or indirect connections to other Subcentrals, but can also contain System-Services (like S1) or other peripheral processes, which can be reached from all peripheral processes of S1–S4 via two Subcentrals. Service-client SC11 reaches System-Service S1 via the path Z1–Z–S1 and S21 via Z1–Z–Z2–S21 and Service-Client S31 System-Service S11 via path Z3–Z–Z1–S11 and S21 via Z3–Z–Z2–S21. S21 can reply to S11 via the path Z2–Z–Z1–S11.

The intoduction of more intermediate layers, whose subsystems can be linked themself to virtually any topology, allows interprocess communication systems according to claim 16 to be scaled to any number of subsystems and peripheral processes. Also the concurrent use of both direct and indirect Link methods in a complete interprocess communication system is possible according to claim 16.

Any peripheral process in an interprocess communication system according to claim 20, but especially System-Services, has the possibility to establish parallel connections to multiple Subcentrals of different subsystems. It is most advantageous, although not required, to handle each connection in a separate thread. Such peripheral processes allow to realize interprocess communication systems in which otherwise disjoint subsystems are allowed to access shared System-Services. Since the subsystems are otherwise disjoint no messages can be exchanged between the subsystems. System-services according to claim 20 offer their functionality and data to all subsystems to which they connect. Within each subsystems shared System-Services cannot be distinguished from private System-Services. Also the question, whether a given System-Services is connected to other subsystems cannot be answered by peripheral processes of an individual subsystems.

Figure 11:
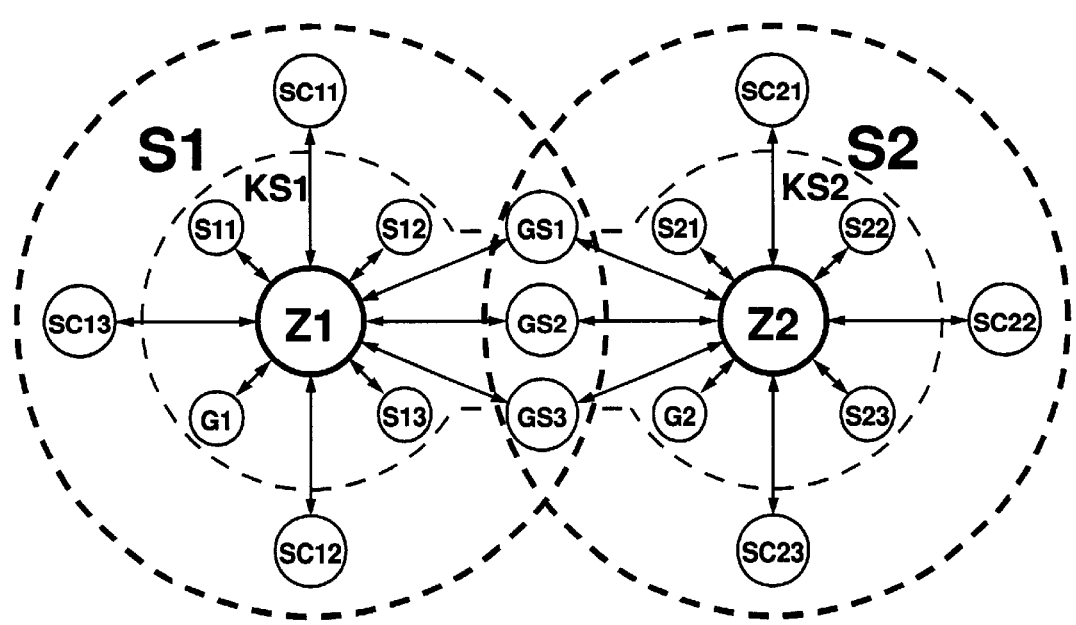
FIG. 11: illustrates an interprocess communication system according to claim 20 consisting of two disjoint subsystems S1 and S2, where each subsystem can access shared services GS1–GS3.

FIG. 11 shows two subsystems S1 and S2, which cannot communicate with each other, because their Subcentrals Z1 and Z2 are neither directly nor indirectly connected. System-services GS1–GS3 maintain parallel connections to both Subcentrals and are therefore available to peripheral processes of both subsystems. On the other hand, System-Services S11–S13 cannot be reached by Service-Clients SC2x nor System-Services S21–S23 by Service-Clients SC1y.

A very advantageous application of shared System-Services is electronic commerce. A provider offers System-Services, which maintain parallel connections to multiple client subsystems. The client subsystems can neither communicate with each other nor do they know the others existence. However, all peripheral processes of all client subsystems have access to the offered System-Services via standing logical connections as if those systems-services are a private part of an individual client system. At the same time, the shared System-Services control to or from which client subsystem they connect or accept connections such that no unauthorized Service-Client can access the shared System-Services. This technique opens completely new markets for online System-Service providers.

If a provider requires additional control over the transactions initiated by peripheral processes of the different client subsystems, it is advantageous to divide the system according to FIG. 10 into two hierarchical levels. The service provider offers his System-Services in the central subsystem ZS. Each transaction of a peripheral process of a peripheral subsystem has to be transmitted by Central Process Z to one of the public System-Services allowing the provider to block or activate individual transactions according to his business policies. At all times the provider has the complete control over all client transactions with his System-Services. At the same time Z can log all transactions for billing or documentation purposes. Compared to the direct use of shared System-Services a hierarchical system architecture has the disadvantage that all peripheral processes of all peripheral subsystems can potentially reach all provided System-Services and the provider cannot provide an individual set of System-Services to individual clients. Nevertheless, this disadvantage can be compensated on the level of individual transaction authorizations.

In an interprocess communication system according to claim 21, a peripheral process can access important system information and take appropriate actions if certain conditions occur. Such a peripheral process is preferably realized as a System-Service to allow remote administration or controlled transactions. But a realization as Service-Client and/or Guard is also possible and can serve specialized purposes.

Interprocess communication systems according to the described claims 1 to 21 are dynamic in the sense that their Central Processes know at all times the availability of all peripheral processes and therefore the complete state of the whole (sub)system. Such networks nevertheless do not have the ability to adapt their logical structure—i.e. their topology and/or transmission policies of their Links and/or Subcentrals and/or the access rights of the peripheral processes to the Central Processes—automatically or upon manual request to changing requirements or environments as covered by claim 22.

In an interprocess communication system according to claim 22 the Central Processes and the peripheral processes have the additional ability to automatically or manually modify important system parameters which define the logical structure of the whole system. Peripheral processes monitoring predefined system parameters can adapt the logical structure of the whole system during operation to changing environmental conditions, system requirements or system load. In an interprocess communication system according to claim 22 a peripheral process could monitor the amount of data transmitted via given connections, the load of Subcentrals or System-Services. If predefined limits are exceeded the peripheral process initiates 1. that a further subcentral with the required System-Services and connections needs to be started, or
2. to stop a subsystem, or
3. additional connections between not directly connected Subsentrals are created, or
4. to close existing connections between Subcentrals.

An interprocess communication system according to one of the described claims can be located anywhere in relation to existing physical network infrastructures like the internet or similar networks. The location of the units is of particular importance in the context of firewall protected areas. Traditional interprocess communication systems, which should be accessible only to limited user groups, cannot run freely in the internet and need to be protected by firewalls to block unauthorized access. This disadvantange is solved by networks according to this invention—called "Private Inter-, Intra- or Extranets" (independence of their location)—, because the access to the peripheral processes and each individual message can be controlled by the Central Process. Interprocess communication systems according to this invention can be freely distributed in the internet without interferences between independent systems and are accessible only to a limited user group with individually definable access rights for each user. In particular it may be advantaguous to locate at least one Central Process and/or at least one Peripheral Process outside of all firewall protected areas or to locate at least one Central Process and/or at least one Peripheral Process within at least one firewall protected area.

Claim 23 concerns the interfacing to prior art network infrastructures. Such systems contain at least one connection between at least one peripheral process according to this invention and a prior art client or server, such that peripheral processes following this invention can access data or functionality of prior art clients or servers without establishing direct connections.

Figure 12:
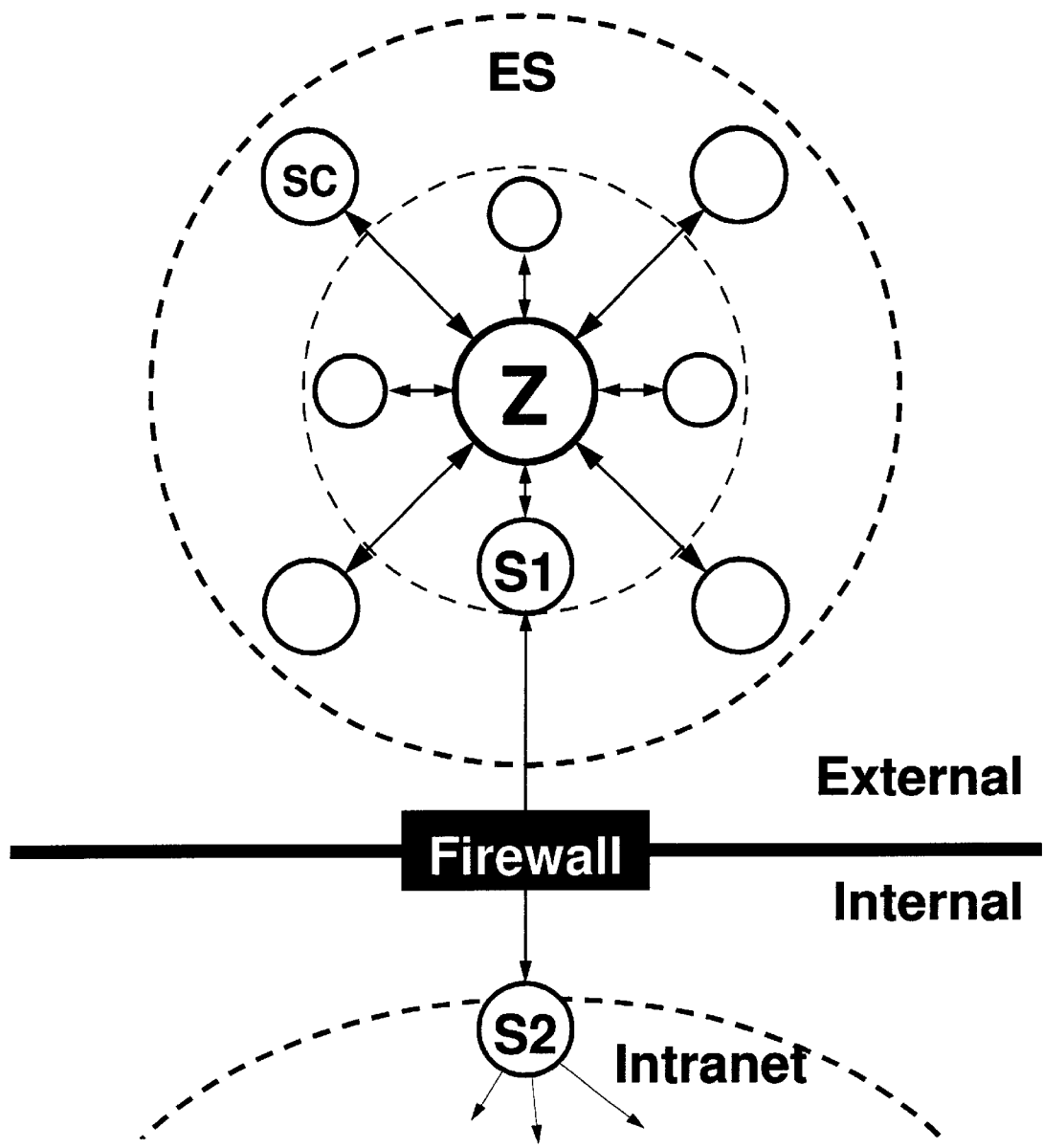
FIG. 12: illustrates an interprocess communication system ES serving as external buffer of a prior art firewall protected internal intranet with only a single connection through the firewall.

Especially advantageous in this context is a system shown in FIG. 12. An external system ES according to this invention includes a System-Service S1 which connects via a firewall to an internal (protected) state of the art service S2. Service-client SC obtains via Central Process Z and S1 the possibility to access selected data or functions of S2 without a direct connection through the firewall to S2. The control over the accessible data or functionality for clients of the external system is determined by the logical structure of the external system ES, the functionality of S1 and S2 and the firewall. Such a system dramatically reduces the number of permitted connections through the firewall (in ideal cases the number can be reduced to one). Such firewalls can impose much stronger criteria to the permitted connections and protect the internal network much better compared to traditional systems where each external client needs to cross the firewalls to access one or more public services.

Figure 13:
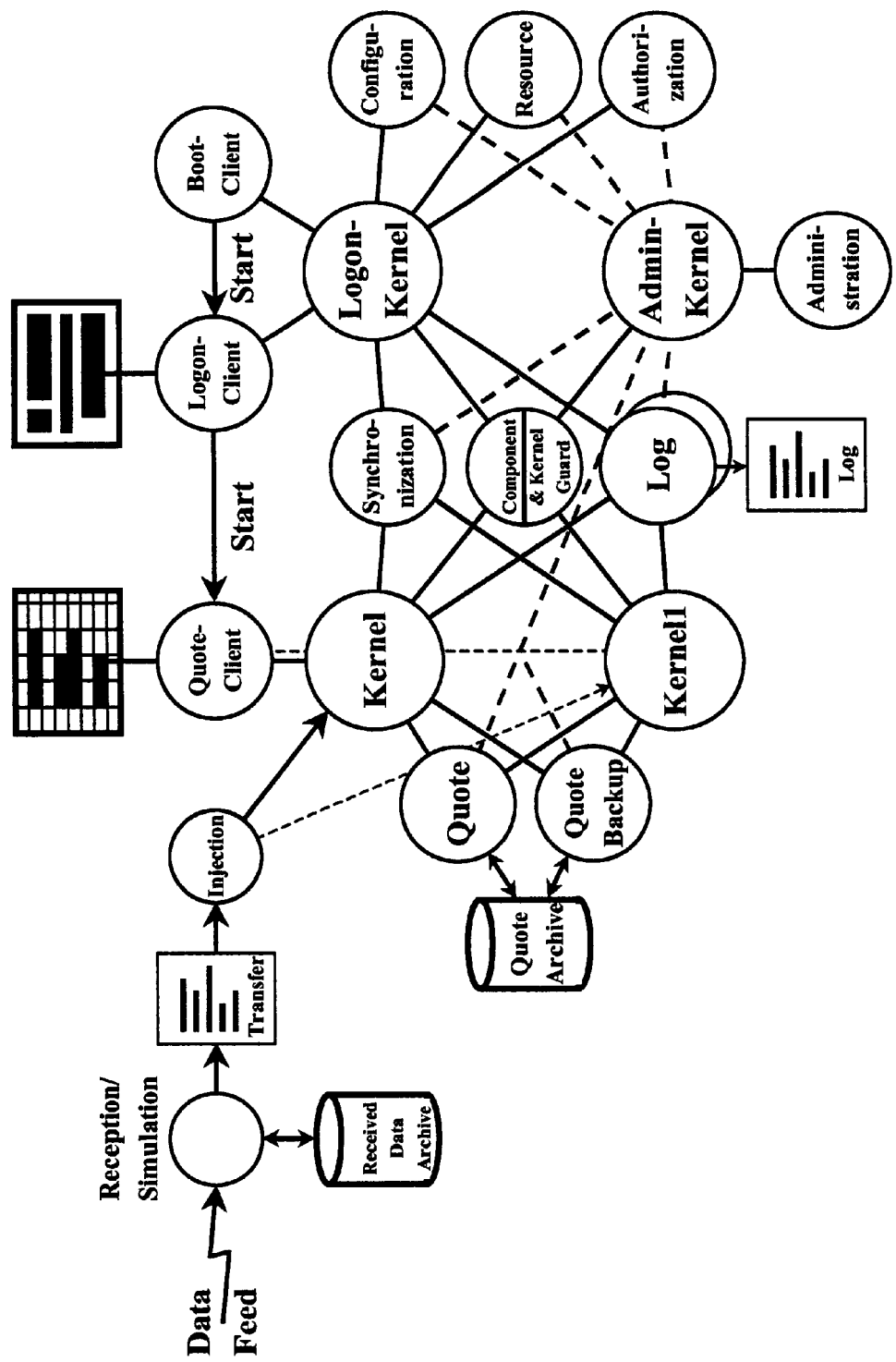
FIG. 13: illustrates a sample incarnation of an interprocess communication system for the reliable reception, distribution and display of real-time stock quotes on a 24 hour base.

FIG. 13 illustrates a sample incarnation of an interprocess communication system to reliably distribute stock quotes in real-time on a 24 h base within a distributed network. In the figure all circles represent processes, all solid lines between the circles standing logical bidirectional communication connections between the respective processes, all dashed lines between the circles potential standing logical bidirectional communication connections between the respective processes. The Central Processes are marked with "CP", "CP1", "Logon-CP" and "Admin-CP", the System-Services with "Quote", "Quote-Backup", "Synchronization", "Log", "Configuration", "Resource", "Authorization" and the Service-Clients with "Injection", "Quote-Client", "Logon-Client" and "Boot-Client". The distribution of the processes on underlying machines is arbitrary, i.e. the system can be executed on a single machine or a distributed network of several machines in a single or a plurality of physical subnetworks.

The system comprises three independent subsystems: 1. the logon subsystem consisting of the Central Procress "Logon-CP" and all Peripheral Processes connected to "Logon-CP", 2. the administration subsystem consisting of the Central Process "Admin-CP" and all Peripheral Processes connected to "Admin-CP", 3. the quote subsystem consisting of the Central Process "CP" together with its backup "CP1" and all Peripheral Processes connected to either "CP" or "CP1".

The Logon-subsystem allows to start up a "Quote-Client" Peripheral Process from any authorized Peripheral Unit with minimal local software installation on said Peripheral Unit. The startup of a "Quote-Client" is performed in two steps: first a "Boot-Client" requests a connection to the "Logon-CP". The "Logon-CP" authorizes the connection request by a transaction with the "Authorization"-Service and, if the authorization check turns out positively, accepts the connection request of the "Boot-Client". The "Boot-Client" downloads from the "Configuration"-Service all configuration items (i.e. executables, libraries, data files etc.) needed to run the "Logon-Client". After the successfull installation of all configuration items required for the "Logon-Client" the "Boot-Client" launches the "Logon-Client" and terminates itself. After a positive authorization check by the "Logon-CP" and the "Authorization"-Service the "Logon-Client" connects to the "Logon-CP" and downloads from the "Resource"-Service the information needed to build up its user interface, and finally displays the logon screen. The logon screen enables a user to initiate a new user session, to enter the user id and password, potentially to select the CP's to which the session should connect, and—after a positive authorization check of the entered user data—to download the configuration items needed by a "Quote-Client" and finally to start a new "Quote-Client". The "Logon-Client" allows the user to start as many parallel sessions under the same or different user identifications as the user is authorized and the physical system resources permit. The "Resource"-Service can provide GUI-information for different languages, enabling the user to switch during operation between the available languages. Upon a language change the "Logon-Client" reloads all required GUI-information from the "Resource"-Service and redraws the logon screen. Upon start the "Quote-Client" receives as one of its input parameters the physical identifications of the peripheral units executing "CP" and "CP1" as well as the local identification of the endpoints provides by "CP" and "CP1". With this information the "Quote-Client" is able to establish a connection to either "CP" or "CP1".

The quote subsystem is double redundant in the sense that it comprises the redundant Central Processes "CP" and "CP1" and the redundant System-Services "Quote" and "Quote-Backup". Both "Quote"-services establish standing logical communication connections to "CP" and "CP1". During normal operation "Quote-Client" s and "Injection" connect to "CP", "Quote" is the Master-System-Service, and "Quote-Backup" runs as Backup-System-Service. Upon failure of CP "Quote-Client" s and "Injection" reconnect to CP1 and the system continues without further deadtime. Upon failure of "Quote", "CP" and "CP1" immediately detect the broken connection to "Quote" and activate "Quote-Backup" as new Master-System-Service. This process takes less than 1s and is completely transparent to the "Quote-Client"s and "Injection". The quote subsystem even survives the simulaneous failure of both "CP" and "Quote"-Service since in this case "CP1" and "Quote-Backup"-Service are still available as backups.

After a "Quote-Client" connects to "CP" or "CP1" it registeres at the "Quote"-service to receive a set of quotes for display on its screen. Upon reception of a quote update from one of the bourses "Injection" send the update via either "CP" or "CP1" to the "Quote" service. The respective Central Process forwards the update all currently connected "Quote"-services ("Quote" and/or "Quote-Backup"). The "Quote"-services receives the updated quotes and updates its internal copy held in memory. Whenever a quote of a registered "Quote-Client" is updated by "Injection", the "Quote"-service sends the updated quote to the respective "Quote-Client", which inturns updates its screen display.

The "Log"- and "Synchronization"-services are connected to all Central Processes. The "Log"-Service(s) collect all log messages from each subsystem at a central place. The "Synchronization"-service synchronizes the system clocks of all participating Peripheral Units by issuing clock messages at regular time intervals.

The administration subsystem comprises the "Admin-CP" and the "Administration". All System-Services are connected via an independent standing logical connection to the "Admin-CP" and are able to receive administrative transaction requests issued by "Administration" and to execute administrative actions.

The Guard is connected to all Central Processes and watches the functionality of the Central Processes as well as the System-Services. A failure of one of the Central Processes is immediately detected by the Guard, because the respective connection breaks. A failure of a System-Service is first detected by all Central Processes to which the System-Service is connected. All Central Processes report any broken connection to any System-Service to the Guard. Upon any failure of either a Central Process or a System-Service, the Guard takes appropriate measures to restart the failed process.

What is claimed is:

1. An interprocess communication system running on a network system comprising at least one central unit and one or more peripheral units physically connected to said central unit, means to establish one or a plurality of direct bidirectional logical communication connections between Peripheral Processes executing on one of said peripheral units or a central unit, and at least one Central Process running on at least one central unit, wherein i. at least one central unit is identified by at least one physical identification unique in the network, and ii. said Central Process provides at least one available connection endpoint, said endpoint being identified by at least one local identification unique on said central unit, and iii. at least one Connection Initiating Peripheral Process comprises means to automatically initiate a connection to said Central Process solely on the basis of said physical identification of said central unit and said local identification of said endpoint of said Central Process, and iv. said Central Process accepts at least one connection from said Connection Initiating Peripheral Process, and wherein v. said at least one communication from said Connection Initiating Peripheral Process connection after its build-up is a standing communication connection, vi. said Central Process assigns to at least one connection of at least one connected Peripheral Process at least one logical identification, such that a Peripheral Process is able to communicate solely on the basis of said at least one logical identification indirectly via said Central Process with at least one member of a group of Peripheral Processes, said group being uniquely determined by said at least one logical identification, and wherein vii. said Central Process sends at least one message, said at least one message is sent by at least one Sending Peripheral Process via at least one Sending Connection to said Central Process and said at least one message contains at least one logical identification of said at least one Receiving Connection of said at least one Receiving Peripheral Process, via said at least one Receiving Connection referenced in said at least one message to said at least one Receiving Peripheral Process.

2. An interprocess communication system running on a network system comprising at least one central unit and one or more peripheral units physically connected to said central unit, means to establish one or a plurality of direct bidirectional logical communication connections between Peripheral Processes executing on one of the peripheral units or a central unit, and at least one Central Process running on at least one central unit, wherein
  i. at least one Connection Accepting Peripheral Process provides at least one available connection endpoint, said endpoint is identified by at least one local identification unique on the unit executing said Connection Accepting Peripheral Process, and
  ii. said Connection Accepting Peripheral Process accepts at feast one connection from said Central Process, and
  iii. each unit executing at least one Connection Accepting Peripheral Process is identified by at least one physical identification unique in the network, and
  iv. said Central Process comprises a database containing at least one entry of at least one Connection Accepting Peripheral Process and each of said at least one entry in said database includes at least one physical identification of the unit and at least one local identification of the connection endpoint of the associated Connection Accepting Peripheral Process, and
  v. said Central Process comprises means to initiate at least one connection and initiates automatically at least one connection to at least one Connection Accepting Peripheral Process contained in said database,
and wherein
  vi. said at least one communication connection to at least one Connection Accepting Peripheral Process after its build-up is a standing communication connection,
  vii. said Central Process assigns to at least one connection of at least one connected Peripheral Process at least one logical identification, such that a Peripheral Process is able to communicate solely on the basis of said at least one logical identification indirectly via said Central Process with at least one member of a group of Peripheral Processes, said group being uniquely determined by said at least one logical identification,
and wherein
  viii. said Central Process sends at least one message, said at least one message is sent by at least one Sending Peripheral Process via at least one Sending Connection to said Central Process and said at least one message contains at least one logical identification of said at least one Receiving Connection of said at least one Receiving Peripheral Process, via said at least one Receiving Connection referenced in said at least one message to said at least one Receiving Peripheral Process.

3. An interprocess communication system running on a network system comprising at least one central unit and one or more peripheral units physically connected to said central unit, means to establish one or a plurality of direct bidirectional logical communication connections between Peripheral Processes executing on one of said peripheral units or a central unit, and at least one Central Process running on at least one central unit, wherein
  i. said central unit is identified by at least one physical identification unique in the network, and
  ii. said Central Process provides at least one available connection endpoint, said endpoint being identified by at least one local identification unique on said central unit, and
  iii. at least one Connection Initialing Peripheral Process comprises means to automatically initiate at least one connection to said Central Process solely on the basis of said physical identification of said central unit and said local identification of said endpoint of said Central Process, and
  iv. said Central Process accepts at least one connection from at least one Connection Initiating Peripheral Process,
and wherein
  v. at least one Connection Accepting Peripheral Process provides at least one available connection endpoint, which endpoint is identified by at least one local identification unique on the unit executing said Connection Accepting Peripheral Process, and
  vi. said Connection Accepting Peripheral Process accepts at least one connection from said Central Process, and
  vii. each unit executing at least one Connection Accepting Peripheral Process is identified by at least one physical identification unique in the network, and
  viii. said Central Process comprises a database containing at least one entry of at least one Connection Accepting Peripheral Process and each of said at least one entry in said database includes at least one physical identification of the unit and at least one local identification of the connection endpoint of the associated Connection Accepting Peripheral Process, and
  ix. said Central Process comprises means to initiate at least one connection and initiates automatically at least one connection to at least one Connection Accepting Peripheral Process contained in said database,
and wherein
  x. said at least one communication connection from at least one Connection Initiating Peripheral Process or to at least one Connection Accepting Peripheral Process after its build-up is a standing communication connection,
  xi. said Central Process assigns to at least one connection of at least one connected Peripheral Process at least one logical identification, such that a Peripheral Process is able to communicate solely on the basis of said at least one logical identification indirectly via said Central Process with at least one member of a group of Peripheral Processes, said group being uniquely determined by said at least one logical identification,
and wherein
  xii. said Central Process sends at least one message, said at least one message is sent by at least one Sending Peripheral Process via at least one Sending Connection to said Central Process and said at least one message contains at least one logical identification of said at least one Receiving Connection of said at least one Receiving Peripheral Process, via said at least one Receiving Connection referenced in said at least one message to said at least one Receiving Peripheral Process.

4. An interprocess communication system according to claim 1, 2 or 3 wherein i. said Central Process destroys, saves, or returns to said Sending Peripheral Process or forwards to all connections of Peripheral Processes connected to said Central Process except the at least one Sending Connection messages not containing any logical identification of said Receiving Connections, or ii. said Central Process informs said Sending Peripheral Process of a message automatically or upon said Sending Peripheral Process request about said individual Receiving Peripheral Process to which Receiving Peripheral Process the message has or has not been successfully sent or at least one of said multiple Receiving Peripheral Processes to which Receiving Peripheral Process the message has been successfully sent or at least one of said multiple Receiving Peripheral Processes to which Receiving Peripheral Process the message has not been successfully sent.

5. An interprocess communication system according to claim 1, 2 or 3 wherein said at least one logical identification assigned by said Central Process to at least one connection of at least one Peripheral Process during the build-up of said connection is unique within said Central Process for said Peripheral Process, such that a Peripheral Process can communicate only with the knowledge of said at least one logical identification indirectly via said Central Process with said uniquely determined Peripheral Process.

6. An interprocess communication system according to claim 1, 2 or 3 wherein said at least one logical identification assigned by said Central Process to at least one connection of at least one Peripheral Process during the build-up of said connection is unique within said Central Process, such that a Peripheral Process can communicate only with the knowledge of said at least one logical identification indirectly via said Central Process via said uniquely determined connection of said Peripheral Process.

7. An interprocess communication system according to claim 1, 2 or 3 wherein said Central Process comprises Access Rights, said Access Rights determine which Connection Initiating Peripheral Prosses said Central Process is allowed to accept or to which Connection Accepting Peripheral Process said Central Process is allowed to initiate a connection and wherein said Access Rights to accept or to initiate a connection by said Central Process can or cannot be modified during system operation, and wherein said Central Process immediately after a change of said Access Rights i. automatically closes connections to connected Peripheral Processes, which connections are forbidden according to the new Access Rights, ii. leaves connections of Peripheral Processes connected, which connections are allowed according to the new Access Rights, and iii only accepts future connections of unconnected Connection Initiating Peripheral Processes allowed according to the new Access Rights or automatically initiates connections to unconnected Connection Accepting Peripheral Processes allowed according to the new Access Rights and contained in the database of said Central Process.

8. An interprocess communication system according to claim 1, 2 or 3 wherein Connection Initiating Peripheral Processes, as included in claim 1 or 3 automatically reestablish broken connections to said Central Process and wherein said Central Process automatically reestablishes broken connections to Connection Accepting Peripheral Processes, as included in claim 2 or 3.

9. An interprocess communication system according to claim 1, 2 or 3 wherein said Central Process sends at least one message, said at least one message is sent by said Sending Peripheral Process via one Sending Connection to said Central Process and said at least one message contains said logical identification of at least one Receiving Connection of at least one Receiving Peripheral Process, after a positive authorization check together with said logical identification of said Sending Connection via said at least one Receiving Connection referenced in said at least one message to said respective Receiving Peripheral Processes, and/or wherein said Central Process after a negative result of said authorization check destroys at least one message and informs said Sending Peripheral Process automatically or upon said Sending Peripheral Processes request over the destruction of said at least one message, and/or wherein said Central Process destroys, saves, or returns to said Sending Peripheral Process or forwards to all connections of Peripheral Processes connected to said Central Process except said Sending Connection after a positive authorization check at least one message not containing any logical identifications of Receiving Peripheral Processes and/or wherein said Central Process informs said Sending Peripheral Process of at least one message automatically or upon said Sending Peripheral Process request about said individual Receiving Peripheral Process to which Receiving Peripheral Processes said at least one message has or has not been successfully sent or at least one of said multiple Receiving Peripheral Processes to which Receiving Peripheral Processes said at least one message has been successfully sent or at least one of said multiple Receiving Peripheral Processes to which Receiving Peripheral Processes said at least one message has not been successfully sent.

10. An interprocess communication system according to claim 9 wherein at least one Peripheral Process can access the criteria of the authorization check performed by said at least Central Process before message transmission and wherein said at least one Peripheral Process can provide said information to at least one other Peripheral Process.

11. An interprocess communication system according to claim 9 wherein the logical structure can be modified during operation and wherein at least one Peripheral Process can modify the criteria of the authorization checks, which said at least one Central Process perform before forwarding said at least one message, and that the concerned at least one Central Process immediately take over the modified information.

12. An interprocess communication system according to claims 1, 2 or 3 wherein the Central Process i. temporarily stores at least one message addressed to at least one known but temporarily not connected Receiving Peripheral Processes and upon reconnection of said temporarily disconnected Receiving Peripheral Process sends said at least one stored messages automatically or upon request in the order of reception by said Central Process or another order to said reconnected Receiving Peripheral Process or ii. returns to said Sending Peripheral Process or destroys at least one message addressed to at least one known but temporarily not connected Receiving Peripheral Process.

13. An interprocess communication system according to claims 1, 2 or 3 wherein i. at least one System-Service Peripheral Process after the establishment of at least one System-Service Connection to or from said at least one Central Process comprises means to wait for an incoming transaction request, to perform after reception of such a transaction request a predefined action in dependence of said request, to eventually send after execution of said action at least one result to said Sending Peripheral Process of said request, to wait for the next incoming request and to repeal this cycle endlessly or wherein ii. at least one Service-Client Peripheral Process after the establishment of at least one Service-Client Connection to or from said at least one Central Process comprises means to automatically or upon request issue in dependence of his tasks at least one transaction request to at least one System-Service Peripheral Process, to receive zero, one or more results from said System-Service Peripheral Process and to repeat said steps an arbitrary number of times in dependence of his tasks and said received results or wherein iii. at least one Guard Peripheral Process comprises means to check the functionality of said at least one Central Process and/or at least one Peripheral Process in regular or irregular intervals and in case of a dysfunction to take at least one action to repair said dysfunction or to signal said dysfunction to at least one other Peripheral Process of the network system or wherein a Peripheral Process having a plurality of connections to said at least one Central Process provides for each of said connections the functionality of either a System-Service Peripheral Process, a Service-Client Peripheral Process or a Guard in Peripheral Process.

14. An interprocess communication system according to claim 13 wherein multiple System-Service Peripheral Processes of the same kind are being executed in parallel at the same time and initiate parallel standing connections to said at least one Central Process or accept parallel standing connections from said at least one Central Process, where each of said at least one Central Processs assigns to all System-Service Peripheral Processes of the same kind at least one for all System-Service Peripheral Processes of the same kind connected to said at least one Central Process identical logical Service Identification, where said Service Identifications of the same System-Service Peripheral Processes can be different for different Central Processes or equal for all Central Processes.

15. An interprocess communication system according to claim 14 wherein each said at least one Central Process sends all transaction requests addressed to a Service Identification to at least one of the said System-Service Peripheral Processes of the same kind and with the same Service Identification, and wherein said at least one Central Process receives all transaction results of at least one transaction request from all System-Service Peripheral Processes of the same kind and with the same Service Identification, and wherein i. either said at least one Central Process determines the final transaction result and sends said final transaction result to said Service-Client Peripheral Process sending the transaction request or ii. said at least one Central Process sends all different transaction results together with their frequency distribution to said Service-Client Peripheral Process sending the transaction request and said Service-Client determines the final transaction result or iii. said Central Process sends all transaction results to said Service-Client Peripheral Process sending the transaction request and said Service-Client Peripheral Process receives all transaction results and determines the final transaction result.

16. An interprocess communication system according to claim 15 wherein said at least one Central Process directs at least one transaction request addressed to one Service Identification to all System-Service Peripheral Processes of the same kind and with the same Service Identification and wherein said at least one Central Process determines exactly one of said System-Service Peripheral Processes of the same kind to be the Master-System-Service for said respective Central Process, and wherein said Master-System-Service sends the transaction result to said Service-Client Peripheral Process and wherein all System-Service Peripheral Processes of the same kind connected to a Central Process with the same logical identification as said Master-System-Service—with the exception of said Master-System-Service itself—execute in the background to backup said Master-System-Service and receive and eventually execute said at least one transaction request to update their internal data, but do not send back transaction results to said Service-Clients and wherein said at least one Central Process upon breakdown of the connection between said Master-System-Service and said Central Process assigns one of said backup System-Service Peripheral Processes of the same kind and with the same Service Identification as said Master-System-Service as new Master-System-Service, such that the whole system continues to operate transparently for all Service-Clients without interruption and wherein said System-Service Peripheral Process executing in backup mode synchronizes automatically or upon request at least once its internal data with the internal data of said Master-System-Service with the same logical identification as said backup System-Service Peripheral Process.

17. An interprocess communication system according to claim 13 wherein at least one Peripheral Process can access the information describing which at least one Peripheral Process is connected to which at least one Central Process, and/or wherein said at least one Peripheral Process can access the information describing which at least one Peripheral Process is allowed to connect to which at least one Central Process and/or the information describing which at least one Central Process is allowed to build up at least one connection to which at least one Peripheral Process and wherein said at least one Peripheral Process can provide said information to at least one other Peripheral Process.

18. An interprocess communication system according to claim 13 wherein the logical structure can be modified during operation and wherein at least one Peripheral Process can modify the information which at least one Peripheral Process is connected to which at least one Central Process and/or which at least one Peripheral Process is permitted to connect to which at least one Central Process and/or which at least one Central Process is permitted to connect to which Peripheral Process and that said concerned at least one Central Process and/or Peripheral Process immediately take over the modified information.

19. An interprocess communication system according to claims 1, 2 or 3 wherein i. said at least one central unit reachable from all peripheral units executes in parallel more than one Central Processes of the same kind, ii. at least one Connection Initiating Peripheral Process—particularly a System Service Peripheral Process—establishes multiple parallel standing connections to at least two of said more than one Central Processes or at least two of said more than one Central Processes establish multiple parallel standing connections to at least one Connection Accepting Peripheral Process—
particularly a System Service Peripheral Process—,
and wherein iii. at least one Connection Initiating Peripheral Process after failure of one Central Process to which Central Process said Connection Initiating Peripheral Process was connected, reconnects to at least one of the other Central Processes.

20. An interprocess communication system according to claim 19, wherein multiple System-Service Peripheral Processes of the same kind are being executed in parallel at the same time and initiate parallel standing connections to at least one Central Process or accept parallel standing connections from at least one Central Process, where said Central Process assigns to all System-Service Peripheral Processes of the same kind at least one for all System-Service Peripheral Processes of the same kind connected to said Central Process identical logical Service Identification, where said at least one Service Identification of the same System-Service Peripheral Processes can be different for different Central Processes or equal for all Central Processes.

21. An interprocess communication system according to claim 20 wherein each Central Process sends all transaction requests addressed to said Service Identification to at least one of said System-Service Peripheral Processes of the same kind and with the same Service Identification, and wherein said Central Process receives at least one transaction results of at least one transaction request from all System-Service Peripheral Processes of the same kind and with the same Service Identification, and wherein i. either said at least one Central Process determines the final transaction result and sends said final result to the Service-Client Peripheral Process sending the transaction request or ii. said at least one Central Process sends all different transaction results together With their frequency distribution to said Service-Client Peripheral Process sending said transaction request and said Service-Client Peripheral Process determines the final transaction result or iii. said Central Process sends all transaction results to said Service-Client Peripheral Process sending said transaction request and said Service-Client Peripheral Process receives all transaction results and determines the final transaction result.

22. An interprocess communication system according to claim 21 wherein said at least one Central Process directs at least one transaction request addressed to one Service Identification to all System-Service Peripheral Processes of the same kind and with the same Service Identification and wherein said at least one Central Process determines exactly one of said System-Service Peripheral Processes of the same kind to be the Master-System-Service for the respective Central Process, and wherein said Master-System-Service sends said transaction result to said Service-Client Peripheral Process and wherein all System-Service Peripheral Processes of the same kind connected to said at least one Central Process with the same logical identification as said Master-System-Service—with the exception of said Master-System-Service itself—execute in the background to backup said Master-System-Service and receive and eventually execute said transaction request to update their internal data, but do not send back transaction results to said Service-Client Peripheral Processes and wherein said at least one Central Process upon breakdown of the connection between said Master-System-Service and said Central Process assigns one of said backup System-Service Peripheral Processes of the same kind and with the same Service Identification as said Master-System-Service as new Master-System-Service, such that the whole system continues to operate transparently for all Service-Client Peripheral Processes without interruption and wherein said System-Service Peripheral Process executing in backup mode synchronizes automatically or upon request at least once his internal data with the internal data of said Master-System-Service with the same logical identification as said backup System-Service Peripheral Process.

23. An interprocess communication system comprising at least two subnetwork systems, wherein each of the subnetwork systems is a network according to one of the claims 1, 2 or 3 and wherein the Subsystem Central Processes of different subnetworks can be connected in any topology by either standing direct bidirectional logical connections or Linking Peripheral Processes establishing parallel standing direct bidirectional logical connections to two or more of said Subsystem Central Processes of different subnetworks, and wherein said Subsystem Central Processes forward at least one message addressed to at least one logical identification of at least one connection of another Subsystem Central Process to the Subsystem Central Process to which the connection identified by said logical connection exists.

24. An interprocess communication system according to claim 23 wherein each of said two or more Subsystem Central Processes has at least one locally—for all directly or indirectly via exactly one Linking Peripheral Process connected Subsystem Central Processes—unique logical identification and wherein said Subsystem Central Processes transmit at least one message to at least one Receiving Peripheral Process, which Receiving Peripheral Process is connected to other Subsystem Central Processes than the Sending Peripheral Process, to the at least one Subsystem Central Processes of the Receiving Peripheral Process, where each address of said at least one message Receiving Peripheral Processes contains in addition to the logical identification of the Receiving Peripheral Process a sequence of at least one Subsystem Central Process identification describing via which at least one Subsystem Central Process the Receiving Peripheral Process can be reached, and wherein said Subsystem Central Processes transmit said at least one message directly or indirectly via a Linking Peripheral Process to the next Subsystem Central Process in said sequence of Subcentral Central Process identifications, until said at least one message reaches the Subsystem Central Process to which the Receiving Peripheral Process is connected and the latter Subsystem Central Process sends said at least one message together with the inverted sequence of at least one Subsystem Central Process identification to said Receiving Peripheral Process.

25. An interprocess communication system according to claim 23 wherein each Linking Peripheral Process connects to exactly two Subsystem Central Processes and each Linking Peripheral Process has at least one locally—for all Subsystem Central Processes to which said Linking Peripheral Process is connected—unique logical identification and wherein said Subsystem Central Processes transmit at least one message to at least one Receiving Peripheral Process connected to other Subsystem Central Processes than said Sending Peripheral Process, to at least one Subsystem Central Process of said Receiving Peripheral Process, where each address of said at least one message Receiving Peripheral Processes contains in addition to said logical identification of said Receiving Peripheral Process a sequence of at least one Linking Peripheral Process identifications describing via which at least one Linking Peripheral Process said Receiving Peripheral Process can be reached, and wherein said Subsystem Central Processes transmit said at least one message to the next Linking Peripheral Process in said sequence of Linking Peripheral Process Identifications and said at least one Linking Peripheral Processes transmit said at least one message to the—uniquely determined—other connected Subsystem Central Process, until said at least one message reach the Subsystem Central Process to which said Receiving Peripheral Process is connected and the latter Subsystem Central Process sends said at least one messages together with the inverted sequence of said said at least one Linking Peripheral Process identification to said Receiving Peripheral Process.

26. An interprocess communication system according to claim 23 wherein the Linking Peripheral Process or Subsystem Central Process select at least one message, said at least one message is allowed to be transmitted from one subsystem to another, according to Policies, and wherein each Linking Peripheral Process or each Subsystem Central Process comprises its own message transmission Policies or the transmission of messages follows the same Policies in the network system, and wherein the Policies of individual Linking Peripheral Processes and/or Subsystem Central Processes can or cannot be changed during system operation, and wherein said Linking Peripheral Processes and/or Subsystem Central Processes automatically or upon request exchange their Policies in regular or irregular intervals and update their own Policies according to the Policies of the at least one other Linking Peripheral Processes and/or Subsystem Central Processes, and wherein the Policies of the individual Linking Peripheral Processes and/or Subsystem Central Processes depend at least on the quality of said at least one message and/or the type of said Sending Peripheral Process and/or the type of said Receiving Peripheral Process and/or the user of said Sending Peripheral Process and/or the subsystem of said Sending Peripheral Process and/or the subsystem of said Receiving Peripheral Process and/or said transmission facilities between the subsystems of said Sending Peripheral Process and the subsystem of said Receiving Peripheral Process.

27. An interprocess communication system according to claim 23 wherein at least one Connection Initiating Peripheral Process—particularly a System-Service Peripheral Process—comprises means to establish parallel communication connections to at least two Central Processes belonging to at least two different subsystems or wherein at least one Connection Accepting Peripheral Process particularly a System-Service Peripheral Process—comprises means to accept parallel communication connections from at least two Central Processes belonging to at least two different subsystems.

28. An interprocess communication system according to claim 23 wherein at least one Peripheral Process can access the information describing which at least one Linking Peripheral Process and/or Central Process is connected with which at least one Central Process, and wherein said at least one Peripheral Process can access the information describing which at least one Linking Peripheral Process and/or Central Process is allowed to connect to which at least one Central Process and/or the information describing which at least one Central Process is allowed to build up at least one connection to which at least one Linking Peripheral Process and/or Central Process, and/or wherein said at least one Peripheral Process can access the transmission Policies of at least one Linking Peripheral Process and/or Subsystem Central Process and wherein said at least one Peripheral Process can provide said information to at least one other Peripheral Process.

29. An interprocess communication system according to claim 23 wherein the logical structure can be modified during operation and wherein at least one Peripheral Process can modify the information which at least one Linking Peripheral Process and/or Central Process is connected to which at least one Central Process and/or which at least one Linking Peripheral Process and/or Central Process is permitted to connect to which at least one Central Process and/or which at least one Central Process is permitted to connect to which at least one Linking Peripheral Process and/or Central Process and/or the transmission policies of said at least one Linking Peripheral Process and/or Central Process and that the concerned at least one Central Process and/or Linking Peripheral Process immediately take over the modified information.

30. An interprocess communication system according to claims 1, 2 or 3 wherein at least one Peripheral Process can access the information describing which at least one Peripheral Process is connected to which at least one Central Process, and/or wherein said at least one Peripheral Process can access the information describing which at least one Peripheral Process is allowed to connect to which at least one Central Process and/or the information describing which at least one Central Process is allowed to build up connections to which at least one Peripheral Process and wherein said at least one Peripheral Process can provide said information to at least one other Peripheral Process.

31. An interprocess communication system according to claims 1, 2 or 3 wherein the logical structure can be modified during operation and wherein at least one Peripheral Process can modify the information which at least one Peripheral Process is connected to which at least one Central Process and/or which at least one Peripheral Process is permitted to connect to which at least one Central Process and/or which at least one Central Process is permitted to connect to which at least one Peripheral Process and that the concerned at least one Central Process and/or Peripheral Process immediately take over the modified information.

32. An interprocess communication system according to claims 1, 2 or 3 wherein at least one Peripheral Process initiates at least one connection to at least one prior art service and/or at least one Peripheral Process accepts at least one connection from at least one prior art client, and wherein at least one connection between said Peripheral Process and a prior art client and/or prior art service can traverse at least one firewall, and wherein said at least one Peripheral Process connected to at least one prior art service and/or prior art client provides data or functionality of said prior art service and/or prior art client to at least one other Peripheral Process, such that said at least one other Peripheral Process can access the data or functionality of said prior art service and/or prior art client without to build up any direct connection to said prior art service nor to accept any direct connection from said prior art client.

* * * * *